United States Patent
Jiang et al.

(10) Patent No.: US 7,444,033 B2
(45) Date of Patent: Oct. 28, 2008

(54) METHOD AND APPARATUS FOR EXTRACTING PIXEL VALUES

(75) Inventors: Jianmin Jiang, Cardiff (GB); Li-Qun Xu, Ipswich (GB)

(73) Assignee: British Telecommunications PLC, London (GB)

( * ) Notice: Subject to any disclaimer, the term of this patent is extended or adjusted under 35 U.S.C. 154(b) by 729 days.

(21) Appl. No.: 10/499,680

(22) PCT Filed: Dec. 24, 2002

(86) PCT No.: PCT/GB02/05924

§ 371 (c)(1),
(2), (4) Date: Jun. 22, 2004

(87) PCT Pub. No.: WO03/058972

PCT Pub. Date: Jul. 17, 2003

(65) Prior Publication Data

US 2005/0065988 A1    Mar. 24, 2005

(30) Foreign Application Priority Data

Jan. 7, 2002  (EP) ................... 02250075

(51) Int. Cl.
  *G06K 9/36*  (2006.01)
  *G06K 9/68*  (2006.01)
  *G06K 9/46*  (2006.01)

(52) U.S. Cl. .................... 382/250; 382/220

(58) Field of Classification Search ............. 382/232, 382/233, 238, 246, 250, 251, 284, 305, 190, 382/219, 220; 375/240.2; 348/395.1; 708/402
See application file for complete search history.

(56) References Cited

U.S. PATENT DOCUMENTS

| | | | |
|---|---|---|---|
| 4,504,860 A | | 3/1985 | Nicol et al. |
| 5,049,992 A | | 9/1991 | Citta et al. |
| 5,453,788 A | | 9/1995 | Matsushima et al. |
| 5,703,965 A | * | 12/1997 | Fu et al. .............. 382/232 |
| 5,883,979 A | * | 3/1999 | Beretta et al. .......... 382/251 |

(Continued)

FOREIGN PATENT DOCUMENTS

| | | |
|---|---|---|
| EP | 0 838 954 | 4/1998 |
| EP | 0838954 A2 | 4/1998 |
| EP | 0 973 337 | 1/2000 |
| EP | 0973337 A2 | 1/2000 |

OTHER PUBLICATIONS

International Search Report—Jul. 16, 2003.

(Continued)

*Primary Examiner*—Amir Alavi
(74) *Attorney, Agent, or Firm*—Nixon & Vanderhye PC

(57) ABSTRACT

The luminance and chrominance values of pixels encoded according to MPEG or JPEG encoding are extracted using a forward discrete cosine transform (DCT). The forward DCT used in MPEG encoding is analyzed to derive a set of equations which directly relate a pixel value in an encoded image to one or more of the DCT coefficients obtained via the forward DCT transform in the usual image encoding process. These predetermined equations are used to allow for extremely fast and computationally efficient extraction of pixel values directly from the DCT coefficients of an encoded pixel block, without having to undergo an inverse DCT transform. Original images from MPEG and JPEG encoded versions may be extracted in a fast and efficient manner.

17 Claims, 13 Drawing Sheets

U.S. PATENT DOCUMENTS

| | | | |
|---|---|---|---|
| 6,052,703 A * | 4/2000 | Redford | 708/402 |
| 6,141,059 A | 10/2000 | Boyce et al. | |
| 6,381,369 B1 * | 4/2002 | Kondo | 382/238 |
| 6,882,752 B1 * | 4/2005 | Abe | 382/250 |
| 7,035,471 B2 * | 4/2006 | Kondo et al. | 382/233 |

OTHER PUBLICATIONS

Seong-OK Bae et al, "A Computationally Efficient IDCT Algorithm", 1997 IEEE.

Merhav et al., "A Transform Domain Approach to Spatial Domain Image Scaling", 1996 IEEE.

Jiang et al., "Video Extraction for Fast content Access to MPEG Compressed Videos", 2004 IEEE.

Merhav et al, "A Transform Domain Approach to Spatial Domain Image Scaling", 1996 IEEE International Conference on Acoustics, Speech and Signal Processing—Proceedings. (ICASSP). Atlanta, May 7-10, 1996, IEEE International Conference on Acoustics, Speech, and Signal Processing—Proceedings. (ICASSP), New York, IEEE, US, vol. 4 Conf. 21, May 1996, pp. 2403-2406.

Seong-Ok et al, "A Computationally Efficient IDCT Algorithm", Circuits and Systems, 1997. Proceedings of the 40th Midwest Symposium on Sacramento, CA, USA, Aug. 3-6, 1997, New York, NY, USA, IEEE, US, Aug. 3, 1997, pp. 973-976.

* cited by examiner

Figure 6

|    | 0     | 1      | 2      | 3      | 4       | 5       | 6       | 7      |
|----|-------|--------|--------|--------|---------|---------|---------|--------|
| 0  | 0.125 | 0.176  | 0.125  | 0.085  | 0.176   | 0.176   | 0.176   | 0.125  |
| 1  | 0.125 | 0.06   | -0.125 | 0.181  | 0.176   | 0.0625  | -0.176  | -0.25  |
| 2  | 0.125 | -0.06  | -0.125 | 0.181  | 0.176   | -0.0625 | -0.176  | 0.25   |
| 3  | 0.125 | -0.176 | 0.125  | -0.085 | -0.176  | -0.176  | 0.176   | -0.125 |
| 4  | 0.125 | 0.176  | 0.125  | 0.085  | 0.0625  | 0.0625  | 0.0625  | 0.042  |
| 5  | 0.125 | 0.06   | -0.125 | -0.181 | 0.0625  | 0       | -0.0625 | -0.085 |
| 6  | 0.125 | -0.06  | -0.125 | 0.181  | 0.0625  | 0       | -0.0625 | 0.085  |
| 7  | 0.125 | -0.176 | 0.125  | -0.085 | 0.0625  | -0.0625 | 0.0625  | -0.042 |
| 8  | 0.125 | 0.176  | 0.125  | 0.085  | -0.0625 | -0.0625 | -0.0625 | -0.042 |
| 9  | 0.125 | 0.06   | -0.125 | -0.181 | -0.0625 | 0       | 0.0625  | 0.085  |
| 10 | 0.125 | -0.06  | -0.125 | 0.181  | -0.0625 | 0       | 0.0625  | -0.085 |
| 11 | 0.125 | -0.176 | 0.125  | -0.085 | -0.0625 | 0.0625  | -0.0625 | 0.04   |
| 12 | 0.125 | 0.176  | 0.125  | 0.085  | -0.176  | 0.0625  | -0.0625 | -0.125 |
| 13 | 0.125 | 0.06   | -0.125 | -0.181 | -0.176  | -0.176  | -0.176  | 0.25   |
| 14 | 0.125 | -0.06  | -0.125 | 0.181  | -0.176  | -0.0625 | 0.176   | -0.25  |
| 15 | 0.125 | -0.176 | 0.125  | -0.085 | -0.176  | 0.176   | 0.176   | 0.125  |

Figure 7(a)

|    | 8      | 9       | 10     | 11     | 12     | 13     | 14     | 15      |
|----|--------|---------|--------|--------|--------|--------|--------|---------|
| 0  | 0.125  | 0.176   | 0.125  | 0.085  | 0.085  | 0.125  | 0.085  | 0.0625  |
| 1  | 0.125  | 0.0625  | -0.125 | -0.181 | 0.085  | 0.042  | -0.085 | -0.125  |
| 2  | 0.125  | -0.0625 | -0.125 | 0.181  | 0.085  | -0.042 | -0.085 | 0.125   |
| 3  | 0.125  | -0.176  | 0.125  | -0.085 | 0.085  | -0.125 | 0.085  | -0.0625 |
| 4  | -0.125 | -0.176  | -0.125 | -0.085 | -0.18  | -0.25  | -0.18  | -0.125  |
| 5  | -0.125 | -0.0625 | 0.125  | 0.181  | -0.18  | -0.085 | 0.18   | 0.25    |
| 6  | -0.125 | 0.0625  | 0.125  | -0.181 | -0.18  | 0.085  | 0.18   | -0.25   |
| 7  | -0.125 | 0.176   | -0.125 | 0.085  | -0.18  | 0.25   | -0.18  | 0.125   |
| 8  | -0.125 | -0.176  | -0.125 | -0.085 | 0.18   | 0.25   | 0.18   | 0.125   |
| 9  | -0.125 | -0.0625 | 0.125  | 0.181  | 0.18   | 0.085  | -0.18  | -0.25   |
| 10 | -0.125 | 0.0625  | 0.125  | -0.181 | 0.18   | -0.085 | -0.18  | 0.25    |
| 11 | -0.125 | 0.176   | -0.125 | 0.085  | 0.18   | -0.25  | 0.18   | -0.125  |
| 12 | 0.125  | -0.176  | 0.125  | 0.085  | -0.085 | -0.125 | -0.085 | -0.0625 |
| 13 | 0.125  | -0.0625 | -0.125 | -0.181 | -0.085 | -0.042 | 0.085  | 0.125   |
| 14 | 0.125  | 0.0625  | -0.125 | 0.181  | -0.085 | 0.042  | 0.085  | -0.125  |
| 15 | 0.125  | 0.176   | 0.125  | -0.085 | -0.085 | 0.125  | -0.085 | 0.0625  |

Figure 7(b)

Figure 13
Figure 14

METHOD AND APPARATUS FOR EXTRACTING PIXEL VALUES

This application is the US national phase of international application PCT/GB02/05924 filed 24 Dec. 2002 which designated the U.S. and claims benefit of EP 02250075.5, dated 7 Jan. 2002, the entire content of which is hereby incorporated by reference.

TECHNICAL FIELD

The present invention relates to a method, apparatus and computer program for directly extracting pixel values from discrete cosine transform (DCT) coefficients, and in particular for extracting such values without having to undertake an inverse DCT transform.

BACKGROUND TO THE PRESENT INVENTION AND PRIOR ART

With the proliferation of Internet and the rapid deployment of multimedia information technology in e-commerce and across various business sectors, the cost of digital storage is being reduced at an unimaginable rate. It is now possible to store rich content information not only in text form, but also in the form of digital images, digital videos, 3-D computer graphics and many other digital data formats. After the arrival of the World-Wide-Web, information exchange and creation is under revolutionary change such that storehouses of Internet-accessible information are becoming increasingly common. One impact upon the whole sector of information related disciplines is the need for developing new technologies to handle, manage and archive the content of multimedia information with efficiency, effectiveness and robustness. During this process, millions of images, video clips could be handled, searched, indexed and retrieved, yet the majority of them could already be in compressed format. Amongst all compressed formats presently used, the discrete cosine transform (DCT) is widely adopted on the grounds that: (a) the discrete cosine transform is close to the optimal Karhunen-Loéve transform (KLT); (b) the DCT is signal independent and capable of eliminating the shortcoming of KLT; and (c) it has real coefficients, and fast algorithms are readily available for efficient implementation in practice. Hence, the DCT is widely used in image/video compression standards (JPEG/MPEG, and H261/H263) (see J. Jiang 'A parallel algorithm for 4×4 DCT' *Journal of Parallel and Distributed Computing*, Vol. 57, 1999, pp 257-269, ISDN: 0743-7315 and V. Bhaskaran and K. Konstanti, *Image and Video Compression Standards: Algorithms and Architectures*, Kluwer Academic Publications, Boston, 1997) Under this context, a new wave of research on image processing in compressed domain or content description inside data compression is being launched in the worldwide research community, as described in A. Abdel-Malek and J. E. Hershey, "Feature cueing in the discrete cosine domain", Journal of Electronic Imaging, Vol. 3, pp. 71-80, January, 1994, B. Shen and Ishwar K. Sethi, "Direct feature extraction from compressed images", *SPIE*: Vol. 2670 *Storage & Retrieval for Image and Video Databases* IV, 1996, and R. Reeve, K. Kubik and W. Osberger, "Texture characterization of compressed aerial images using DCT coefficients", *Proc. of SPIE: Storge and Retrival for Image and Video Databases V*, Vol. 3022, pp. 398-407, February, 1997.

As will be apparent from the above, MPEG and JPEG encoding of moving and still images is well known in the art, and a common encoder and decoder architecture is shown in FIG. 1. To encode MPEG (and JPEG) images, the source pixel image is first split into 8×8 blocks which are then each subject to a discrete cosine transform (DCT). This results in 64 DCT coefficients, with the DC component in the top-left corner, and increasingly higher order AC components distributed outwards from the top-left throughout the pixel block. These components are then quantised using a binary code from a codebook to represent each of those real number DCT coefficients, and also to get rid of those coefficients whose values are below a quantization threshold, and are then converted to a serial data word by taking the coefficients in a zig-zag pattern (as shown in FIG. 2) so that the components which have been quantised to zero can be efficiently run-length encoded, followed by entropy encoded prior to transmission. This process is repeated for every 8×8 pixel block in the image.

To decode an image at the decoder, conventionally the reverse process has been performed i.e., entropy and run-length decode the received data, reconstruct the DCT coefficients in 8×8 blocks by reversing the zig-zag pattern of FIG. 2, and perform an Inverse DCT (IDCT) to obtain the actual pixel values. The inverse DCT step is computationally intensive, requiring time and power to perform. Typically, for standard full decompression (IDCT) the computing cost is 4096 multiplications and 4032 additions, although some practical implementations may only require 1024 multiplications and 896 additions per 8×8 pixel block (see table in our "Results" section for further comparison).

Although the area of image processing has been a focus of research and development for many years (typified by tasks such as enhancement, segmentation, feature extraction, and pattern classification etc) such development has all been in the pixel-domain. While DCT-based data compression greatly improves the transmission efficiency and the management of limited storage space, compressed visual data has to be processed back to the pixel domain before being displayed, further processed, or printed. Some of the frequently employed processing functions include scaling, filtering, rotation, translation, feature extraction and classification. To this end, conventional approaches have to convert (decompress) the data from the DCT domain to the pixel domain before such existing algorithms can be applied. Such processing leads to significant increases in overhead computing cost and storage expense in the entire chain of image processing and compression, as will be apparent from the computational intensity figures given earlier. There is therefore a strong need within the industry for a less computationally intensive means of allowing mass image media to be processed, without having to fully decompress each image using an IDCT operation whenever an image operation (searching, filtering, displaying etc.) has to be performed.

SUMMARY OF THE INVENTION

The present invention addresses the above problem by providing a method, computer program and apparatus which remove the need for performing an inverse discrete cosine transform in order to decode an MPEG or JPEG encoded image. That is, with reference to the prior art decoder shown in FIG. 1, the invention provides a method, computer program, and apparatus which replaces the inverse discrete cosine transform block 10 and allows for pixels values to be directly extracted from the DCT coefficients by the application of a set of predefined, simple, linear equations which relate the extracted pixel values directly to the DCT coefficients via a set of parameters. Therefore, in order to extract the source image from the MPEG or JPEG encoded domain, all the decoder need calculate is the result of the predetermined set of equations for a given set of input DCT coefficients, and it is therefore no longer required to perform an inverse DCT transform with the computational intensity attendant therewith.

In view of the above, from a first aspect according to the present invention there is provided a method of extracting pixel values from a signal comprising a plurality of discrete cosine transform (DCT) coefficients derived from values of pixels in a source image, the method comprising the steps of:

storing a plurality of pre-calculated parameters, each of which is associated with a particular pixel whose value is to be extracted; and for any particular pixel value to be extracted, calculating the pixel value using the pre-calculated parameters associated therewith together with one or more of the DCT coefficients.

The ability to calculate a pixel value using the pre-calculated parameters together with one or more of the DCT coefficients means that computational intensity is much reduced. Depending on the specific implementation adopted, for an 8×8 block of pixels in the original image, it is possible to extract the pixel values from an MPEG or JPEG encoded version with as little as eight addition and four division operations. As will be apparent, this is a significant reduction in comparison to the full inverse discrete cosine transform which has been used previously.

Furthermore, preferably a pre-selected subset of the DCT coefficients are used to calculate the pixel values. As will become apparent from the specific embodiments, only a relatively small subset of DCT coefficients from any particular pixel block are required for the operation of the present invention. In one embodiment, as few as four coefficients are needed, whereas in other embodiments, 9, or 16 coefficients maybe used. Whichever embodiment is chosen it will be appreciated that the number of DCT coefficients used is substantially less than the 64 coefficients conventionally used within a full inverse discrete cosine transform implementation. This is an important result, as it may facilitate extremely low bandwidth video transmission.

Furthermore, the pre-calculated parameters relate the pixel values to be extracted to the DCT coefficients according to a plurality of predefined relationships. The relationships are extremely simple, thus further refusing computational intensity.

Preferably, the DCT coefficients used in the calculating step have an index value of zero. Moreover, preferably the DCT coefficients used in the calculating step are those which are representative of the highest energy with respect to the DCT transform. These features provide the advantages that the complexity of the equations used to find the pixel values is reduced, and the greatest computational cost saving can be made.

Moreover, it is possible to extract a lower number of pixels per input pixel block than in the original image, thereby allowing for resolution to be reduced in a convenient manner. This might be useful if the extracted image is for display on a small screen, such as a those provided on personal digital assistants (PDAs) or mobile telephones.

From another aspect, the present invention also provides a computer program for extracting pixel values from a signal comprising a plurality of discrete cosine transform coefficients derived from values of pixels in a source image, the computer program comprising instructions which would when executed on a computer cause the computer to operate in accordance with the method of the first aspect.

Such a computer program provides the advantages that it allows the method of the present invention to be run on a computer.

Preferably, the computer program according to the second aspect is stored on a computer readable storage medium. The computer readable storage medium may be any of a magnetic, optical, magneto-optical, solid state, or any other computer readable storage medium known in the art.

From a third aspect, the present invention also provides an apparatus for extracting pixel values from a signal containing a plurality of discrete cosine transform (DCT) coefficients derived from values of pixels in a source image, the apparatus comprising:

a storage means for storing a plurality of pre-calculated parameters, each of which is associated with a particular pixel whose value is to be extracted; and calculating means for, for any particular pixel value to be extracted, calculating the pixel value using the pre-calculated parameters associated therewith together with one or more of the DCT coefficients.

The third aspect of the invention further provides similar further features and advantages as previously described in respect of the first aspect.

BRIEF DESCRIPTION OF THE DRAWINGS

Further features and advantages of the present invention will become apparent from the following description of embodiments thereof, presented by way of example only, and by reference to the accompanying drawings, wherein like reference numerals refer to like parts, and wherein:

FIG. 6 is a matrix of values which may be used in one of the embodiments of the present invention;

FIGS. 7(a) and (b) when taken together are another matrix of values which are used in one of the embodiments of the present invention;

FIGS. 13(a), (b), and (c) are respectively image frames extracted according to a third embodiment of the present invention; and FIGS. 14(a), (b), and (c) are respectively image frames which were produced using an inverse discrete cosine transform of the prior art.

OVERVIEW OF THE OPERATION OF THE INVENTION

Figure 1:
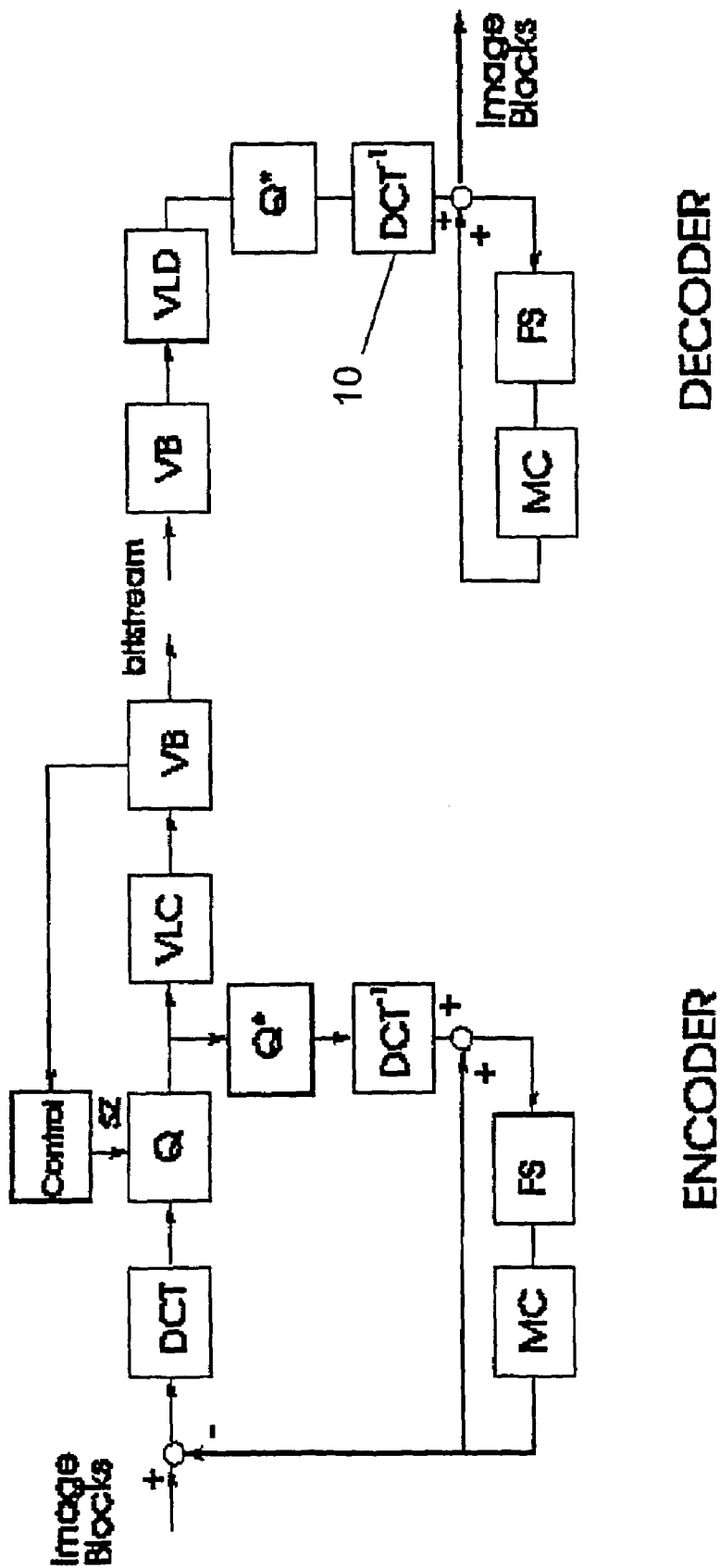
FIG. 1 is a block diagram showing an MPEG encoder and decoder of the prior art.

The present invention replaces the inverse discrete cosine transform operation previously required in MPEG and JPEG decoders. This is achieved by using a set of predefined equations which we have mathematically derived by analysing the forward DCT transform. The set of equations directly relate the pixel values of an image to a subset of the DCT coefficients generated during MPEG and JPEG encoding for each pixel block. By simply placing the values of received DCT coefficients into the equations, pixel values of a decoded image can be directly extracted by an MPEG or JPEG decoder without having to undertake a full inverse discrete cosine transform. The present invention is therefore of great potential, as it will allow for extremely simplified MPEG decoder designs, which will require less power and computational complexity than was previously the case.

The theoretical basis for the derivation of the sets of equations which are used in the present invention will be described next, followed by descriptions of particular embodiments thereof.

Theoretical Basis

DCT-based MPEG compression algorithms work on image blocks of 8×8 pixels to efficiently explore spatial correlations between nearby pixels within the same image. The typical operations as described previously and shown in FIG. 1 at the encoder side include DCT transform (DCT) of the block, quantization of the DCT coefficients (Q) with controllable step size (sz) and variable length coding (VLC) consisting of run-length coding and entropy coding.

Hence, given a MPEG compressed bit stream, the video extraction technique of the present invention first requires normal entropy decoding (VLD) and reconstruction (Q*) to get us into the quantized DCT coefficients domain. It then performs a set of very simple operations, instead of the inverse DCT operation, to extract the desired video images at reduced resolutions. The theoretical basis of these operations is described next.

To design such a direct extraction algorithm, the starting point would seem naturally to be the IDCT operations designed in the original MPEG decoder. However, as the extraction algorithm of the present invention is mainly aimed at extracting approximated pixel information, starting with the IDCT itself proves to be difficult and fails to achieve expected results. This is because the input values for an IDCT are the DCT coefficients themselves, and they are already de-correlated. As a result, any approximation could lead to heavy distortion. Therefore, any approximation should preferably be done in the pixel domain, since neighbouring pixels are correlated and significant redundancy generally exists. To this end, the starting point for the video extraction of the present invention was selected to be the forward DCT operation. Furthermore, to exploit the standard MPEG decoding design, we limit our discussion herein to blocks of 8×8 pixels, although it should of course be understood that the invention can be readily applied to blocks of pixels of different sizes if required.

According to the DCT definition given in J. Jiang 'A parallel algorithm for 4×4 DCT' *Journal of Parallel and Distributed Computing*, Vol. 57, 1999, pp 257-269, ISDN: 0743-7315, one block of 8×8 pixels x(i,j), i,j=0, . . . 7 can be transformed into the DCT domain C(u,v), u,v=0,...,7 via the following equation:

$$C(u,v) = \frac{1}{4}\alpha(u)\alpha(v)\sum_{i=0}^{7}\sum_{j=0}^{7}x(i,j)\cos\left(\frac{(2i+1)u\pi}{16}\right)\cos\left(\frac{(2j+1)v\pi}{16}\right) \quad (1)$$

$$\text{where } \alpha(x) = \begin{cases} \frac{1}{\sqrt{2}} & \text{when } x = 0 \\ 1 & \text{otherwise} \end{cases}$$

In theory this equation can be expressed in matrix form as, $$[C_{uv}] = [A][x_{ij}]$$

where $[C_{uv}]$ is the vector containing 64 DCT coefficient arranged in the order $C_{00}, C_{01}, \ldots C_{77}$, and $[x_{ij}]$ is the vector containing the block of 8×8 pixels. Note that if neither the full resolution of original 8×8 pixels are used nor all the DCT coefficients are desired in the end, a slim down version may be represented as $$[\overline{C}_{uv}] = [\tilde{A}][\overline{x}_{ij}]$$

For example, $[\overline{x}_{ij}]$ can be the 16-dimensional vector containing 4×4 averaged pixels, while $[\overline{C}_{uv}]$ contains up to first 16 non-zero DCT coefficients, and $[\tilde{A}]$ is 16×16 matrix.

The ultimate objective of this study was to derive the matrix $[\tilde{A}]$ in a compact and concise form such that the approximate pixel values with reduced resolutions can be obtained as, $$[\overline{x}_{ij}] = [\tilde{A}]^{-1}[\overline{C}_{uv}]$$

The visual quality and computational efficiency depends on the choice of and number of DCT coefficients used.

For the convenience of our design, equation (1) can be rearranged into:

$$C(u,v) = \frac{1}{4}\alpha(u)\alpha(v)\sum_{i=0}^{7}\cos\left(\frac{(2i+1)u\pi}{16}\right)\sum_{j=0}^{7}x(i,j)\cos\left(\frac{(2j+1)v\pi}{16}\right) \quad (2)$$

$$= \frac{1}{4}\alpha(u)\alpha(v)\sum_{i=0}^{7}\cos\left(\frac{(2i+1)u\pi}{16}\right)\sum_{j=0}^{7}x(i,j)\zeta_j(v)$$

From trigonometric inter-relationships, all the angles represented by $$\left(\frac{(2j+1)v\pi}{16}\right)$$

inside $\zeta_j(v)$ can be mapped into the first quadrant. As j varies inside S=[0,7], the details of the angle mapping can be worked out as follows:

Let $S = S_1 \cup S_2$, where $S_1=[0,3]$ and $S_2=[4,7]$, we have:

$$j = \begin{cases} k & \text{when } j \in S_1 \\ 4+k & \text{when } j \in S_2 \end{cases} \quad k \in S_1 \quad (3)$$

Repeating the above process for k in $S_1$ and $S_2$ respectively, S can be further divided into four sections represented as:

$$S = S_{11} \cup S_{12} \cup S_{21} \cup S_{22} \quad (4)$$

where $S_{11}=[0,1]$, $S_{12}=[2,3]$, $S_{21}=[4,5]$ and $S_{22}=[6,7]$.

This gives us:

$$j = \begin{cases} l & j \in S_{11} \\ 2+l & j \in S_{12} \\ 4+l & j \in S_{21} \\ 6+l & j \in S_{22} \end{cases} \quad l \in S_{11} = [0,1] \quad (5)$$

Substituting (5) in (2), $\zeta_j(v)$ can now be rearranged into the following form:

$$\zeta_j(v) = \begin{cases} \cos\left(\frac{v\pi + 2lv\pi}{16}\right) & j \in S_{11} \\ \cos\left(\frac{5v\pi + 2lv\pi}{16}\right) & j \in S_{12} \\ (-1)^v \cos\left(\frac{7v\pi + 2lv\pi}{16}\right) & j \in S_{21} \\ (-1)^v \cos\left(\frac{3v\pi + 2lv\pi}{16}\right) & j \in S_{22} \end{cases} \quad l \in [0,1] \quad (6)$$

As $v \in [1,7]$, equation (6) becomes:

$$\zeta_j(1) = \begin{cases} \cos\frac{\pi}{16} \\ \cos\frac{3\pi}{16} \\ \cos\frac{5\pi}{16} \\ \cos\frac{7\pi}{16} \\ -\cos\frac{7\pi}{16} \\ -\cos\frac{5\pi}{16} \\ -\cos\frac{3\pi}{16} \\ -\cos\frac{\pi}{16} \end{cases} \quad \zeta_j(2) = \begin{cases} \cos\left(\frac{2\pi + 4l\pi}{16}\right) \\ -\cos\left(\frac{6\pi - 4l\pi}{16}\right) \\ -\cos\left(\frac{2\pi + 4l\pi}{16}\right) \\ \cos\left(\frac{6\pi - 4l\pi}{16}\right) \end{cases} = \begin{cases} \cos\frac{2\pi}{16} \\ \cos\frac{6\pi}{16} \\ -\cos\frac{6\pi}{16} \\ -\cos\frac{2\pi}{16} \\ -\cos\frac{2\pi}{16} \\ -\cos\frac{6\pi}{16} \\ \cos\frac{6\pi}{16} \\ \cos\frac{2\pi}{16} \end{cases} \quad (7)$$

$$\zeta_j(3) = \begin{cases} \cos\left(\frac{3\pi + 6l\pi}{16}\right) \\ -\cos\left(\frac{\pi - 6l\pi}{16}\right) \\ \cos\left(\frac{5\pi - 6l\pi}{16}\right) \\ \cos\left(\frac{7\pi + 6l\pi}{16}\right) \end{cases} = \begin{cases} \cos\frac{3\pi}{16} \\ -\cos\frac{7\pi}{16} \\ -\cos\frac{\pi}{16} \\ -\cos\frac{5\pi}{16} \\ \cos\frac{5\pi}{16} \\ \cos\frac{\pi}{16} \\ \cos\frac{7\pi}{16} \\ -\cos\frac{3\pi}{16} \end{cases} \quad (8)$$

$$\zeta_j(4) = \begin{cases} \cos\left(\frac{4\pi + 8l\pi}{16}\right) \\ -\cos\left(\frac{4\pi + 8l\pi}{16}\right) \\ \cos\left(\frac{4\pi + 8l\pi}{16}\right) \\ -\cos\left(\frac{4\pi + 8l\pi}{16}\right) \end{cases} = \begin{cases} \cos\frac{4\pi}{16} \\ -\cos\frac{4\pi}{16} \\ -\cos\frac{4\pi}{16} \\ \cos\frac{4\pi}{16} \\ \cos\frac{4\pi}{16} \\ -\cos\frac{4\pi}{16} \\ -\cos\frac{4\pi}{16} \\ \cos\frac{4\pi}{16} \end{cases}$$

$$\zeta_j(5) = \begin{cases} \cos\left(\frac{5\pi + 10l\pi}{16}\right) \\ \cos\left(\frac{7\pi - 10l\pi}{16}\right) \\ -\cos\left(\frac{3\pi - 10l\pi}{16}\right) \\ \cos\left(\frac{\pi + 10l\pi}{16}\right) \end{cases} = \begin{cases} \cos\frac{5\pi}{16} \\ -\cos\frac{\pi}{16} \\ \cos\frac{7\pi}{16} \\ \cos\frac{3\pi}{16} \\ -\cos\frac{3\pi}{16} \\ -\cos\frac{7\pi}{16} \\ \cos\frac{\pi}{16} \\ -\cos\frac{5\pi}{16} \end{cases} \quad (9)$$

$$\zeta_j(6) = \begin{cases} \cos\left(\frac{6\pi + 12l\pi}{16}\right) \\ \cos\left(\frac{2\pi - 12l\pi}{16}\right) \\ -\cos\left(\frac{6\pi + 12l\pi}{16}\right) \\ -\cos\left(\frac{2\pi - 12l\pi}{16}\right) \end{cases} = \begin{cases} \cos\frac{6\pi}{16} \\ -\cos\frac{2\pi}{16} \\ \cos\frac{2\pi}{16} \\ -\cos\frac{6\pi}{16} \\ -\cos\frac{6\pi}{16} \\ \cos\frac{2\pi}{16} \\ -\cos\frac{2\pi}{16} \\ \cos\frac{6\pi}{16} \end{cases}$$

$$\zeta_j(7) = \begin{cases} \cos\left(\frac{7\pi + 14l\pi}{16}\right) \\ \cos\left(\frac{3\pi + 14l\pi}{16}\right) \\ \cos\left(\frac{\pi - 14l\pi}{16}\right) \\ \cos\left(\frac{5\pi - 14l\pi}{16}\right) \end{cases} = \begin{cases} \cos\frac{7\pi}{16} \\ -\cos\frac{5\pi}{16} \\ \cos\frac{3\pi}{16} \\ -\cos\frac{\pi}{16} \\ \cos\frac{\pi}{16} \\ -\cos\frac{3\pi}{16} \\ \cos\frac{5\pi}{16} \\ -\cos\frac{7\pi}{16} \end{cases} \quad j \in [0,7] \quad (10)$$

As will be seen from the above, all the angles inside the cosine function are limited to the first quadrant. Hence, when a Taylor series expansion is applied to expand cos(x) at $x_0=\pi/4$, a close approximation should be maintained. Performing such an expansion gives us:

$$\cos(x) = \cos(x_0) + \cos^{(1)}(x_0)(x-x_0) + \frac{\cos^{(2)}(x_0)(x-x_0)^2}{2!} + \ldots \quad (11)$$

$$\frac{\cos^{(n)}(x_0)(x-x_0)^n}{n!}$$

$$= \cos\frac{\pi}{4} - \sin\frac{\pi}{4}\left(x - \frac{\pi}{4}\right) + \ldots$$

$$= \frac{\sqrt{2}}{2}\left(1 - \left(x - \frac{\pi}{4}\right) + \ldots \right)$$

After those terms with orders higher than 1 are ignored, equation (11) becomes:

$$\cos(x) \approx \frac{\sqrt{2}}{2}\left(1 - \left(x - \frac{\pi}{4}\right)\right) \quad (12)$$

Considering the fact that $\zeta_j(v)$ contains cos y/16 as its essential element, equation (12) can be correspondingly arranged into:

$$\cos(x) \approx \frac{\sqrt{2}}{2}\left\{1 - \left(\frac{y - 4\pi}{16}\right)\right\} \quad (13)$$

where $y \in [\pi, 2\pi, 3\pi, 4\pi, 5\pi, 6\pi, 7\pi]$, revealed from equations (7)-(10). Hence, using (13) equations (7)-(10) can be rewritten as:

$$\zeta_j(1) \approx \frac{\sqrt{2}}{2}\begin{Bmatrix} \left(1+\frac{3\pi}{16}\right) \\ \left(1+\frac{\pi}{16}\right) \\ \left(1-\frac{\pi}{16}\right) \\ \left(1-\frac{3\pi}{16}\right) \\ -\left(1-\frac{3\pi}{16}\right) \\ -\left(1-\frac{\pi}{16}\right) \\ -\left(1+\frac{\pi}{16}\right) \\ -\left(1+\frac{3\pi}{16}\right) \end{Bmatrix} \quad \zeta_j(2) \approx \frac{\sqrt{2}}{2}\begin{Bmatrix} \left(1+\frac{2\pi}{16}\right) \\ \left(1-\frac{2\pi}{16}\right) \\ -\left(1-\frac{2\pi}{16}\right) \\ -\left(1+\frac{2\pi}{16}\right) \\ -\left(1+\frac{2\pi}{16}\right) \\ -\left(1-\frac{2\pi}{16}\right) \\ \left(1-\frac{2\pi}{16}\right) \\ \left(1+\frac{2\pi}{16}\right) \end{Bmatrix} \quad (14)$$

$$\zeta_j(3) \approx \frac{\sqrt{2}}{2}\begin{Bmatrix} \left(1+\frac{\pi}{16}\right) \\ -\left(1-\frac{3\pi}{16}\right) \\ -\left(1+\frac{3\pi}{16}\right) \\ -\left(1-\frac{\pi}{16}\right) \\ \left(1-\frac{\pi}{16}\right) \\ \left(1+\frac{3\pi}{16}\right) \\ \left(1-\frac{3\pi}{16}\right) \\ -\left(1+\frac{\pi}{16}\right) \end{Bmatrix} \quad \zeta_j(4) \approx \frac{\sqrt{2}}{2}\begin{Bmatrix} 1 \\ -1 \\ -1 \\ 1 \\ 1 \\ -1 \\ -1 \\ 1 \end{Bmatrix} \quad (15)$$

$$\zeta_j(5) \approx \frac{\sqrt{2}}{2}\begin{Bmatrix} \left(1-\frac{\pi}{16}\right) \\ -\left(1+\frac{3\pi}{16}\right) \\ \left(1-\frac{3\pi}{16}\right) \\ \left(1+\frac{\pi}{16}\right) \\ -\left(1+\frac{\pi}{16}\right) \\ -\left(1-\frac{3\pi}{16}\right) \\ \left(1+\frac{3\pi}{16}\right) \\ -\left(1-\frac{\pi}{16}\right) \end{Bmatrix} \quad \zeta_j(6) \approx \frac{\sqrt{2}}{2}\begin{Bmatrix} \left(1-\frac{2\pi}{16}\right) \\ -\left(1+\frac{2\pi}{16}\right) \\ \left(1+\frac{2\pi}{16}\right) \\ -\left(1-\frac{2\pi}{16}\right) \\ -\left(1-\frac{2\pi}{16}\right) \\ \left(1+\frac{2\pi}{16}\right) \\ -\left(1+\frac{2\pi}{16}\right) \\ \left(1-\frac{2\pi}{16}\right) \end{Bmatrix} \quad (16)$$

$$\zeta_j(7) \approx \frac{\sqrt{2}}{2}\begin{Bmatrix} \left(1-\frac{3\pi}{16}\right) \\ -\left(1-\frac{\pi}{16}\right) \\ \left(1+\frac{\pi}{16}\right) \\ -\left(1+\frac{3\pi}{16}\right) \\ \left(1+\frac{3\pi}{16}\right) \\ -\left(1+\frac{\pi}{16}\right) \\ \left(1-\frac{\pi}{16}\right) \\ -\left(1-\frac{3\pi}{16}\right) \end{Bmatrix} \quad (17)$$

Finally, we have:

$$\sum_{j=0}^{7} x(i,j)\zeta_j(0) = \quad (18)$$
$$x(i,0) + x(i,1) + x(i,2) + x(i,3) + x(i,4) + x(i,5) + x(i,6) + x(i,7)$$

$$\sum_{j=0}^{7} x(i,j)\zeta_j(1) = \quad (19)$$
$$\frac{\sqrt{2}}{2}\left\{\left(1+\frac{3\pi}{16}\right)x(i,0) + \left(1+\frac{\pi}{16}\right)x(i,1) + \left(1-\frac{\pi}{16}\right)x(i,2) + \right.$$
$$\left(1-\frac{3\pi}{16}\right)x(i,3) - \left(1-\frac{3\pi}{16}\right)x(i,4) -$$
$$\left. \left(1-\frac{\pi}{16}\right)x(i,5) - \left(1+\frac{3\pi}{16}\right)x(i,6) + \left(1+\frac{3\pi}{16}\right)x(i,7)\right\}$$

$$\sum_{j=0}^{7} x(i,j)\zeta_j(2) = \quad (20)$$
$$\frac{\sqrt{2}}{2}\left\{\left(1+\frac{2\pi}{16}\right)x(i,0) + \left(1-\frac{2\pi}{16}\right)x(i,1) - \left(1-\frac{2\pi}{16}\right)x(i,2) - \right.$$
$$\left(1+\frac{2\pi}{16}\right)x(i,3) - \left(1+\frac{2\pi}{16}\right)x(i,4) -$$
$$\left. \left(1-\frac{2\pi}{16}\right)x(i,5) + \left(1-\frac{2\pi}{16}\right)x(i,6) + \left(1+\frac{2\pi}{16}\right)x(i,7)\right\}$$

-continued $$\sum_{j=0}^{7} x(i, j)\zeta_j(3) = \qquad (21)$$

$$\frac{\sqrt{2}}{2}\left\{\left(1+\frac{\pi}{16}\right)x(i, 0)-\left(1-\frac{3\pi}{16}\right)x(i, 1)-\left(1+\frac{3\pi}{16}\right)x(i, 2)-\right.$$
$$\left(1-\frac{\pi}{16}\right)x(i, 3)+\left(1-\frac{\pi}{16}\right)x(i, 4)+$$
$$\left.\left(1+\frac{3\pi}{16}\right)x(i, 5)+\left(1-\frac{3\pi}{16}\right)x(i, 6)-\left(1+\frac{\pi}{16}\right)x(i, 7)\right\}$$

$$\sum_{j=0}^{7} x(i, j)\zeta_j(4) = \frac{\sqrt{2}}{2}\{x(i, 0) - x(i, 1) - \qquad (22)$$
$$x(i, 2) + x(i, 3) + x(i, 4) - x(i, 5) - x(i, 6) + x(i, 7)$$

$$\sum_{j=0}^{7} x(i, j)\zeta_j(5) = \qquad (23)$$

$$\frac{\sqrt{2}}{2}\left\{\left(1-\frac{\pi}{16}\right)x(i, 0)-\left(1+\frac{3\pi}{16}\right)x(i, 1)+\left(1-\frac{3\pi}{16}\right)x(i, 2)+\right.$$
$$\left(1+\frac{\pi}{16}\right)x(i, 3)-\left(1+\frac{\pi}{16}\right)x(i, 4)-$$
$$\left.\left(1-\frac{3\pi}{16}\right)x(i, 5)+\left(1+\frac{3\pi}{16}\right)x(i, 6)-\left(1-\frac{\pi}{16}\right)x(i, 7)\right\}$$

$$\sum_{j=0}^{7} x(i, j)\zeta_j(6) = \qquad (24)$$

$$\frac{\sqrt{2}}{2}\left\{\left(1-\frac{2\pi}{16}\right)x(i, 0)-\left(1+\frac{2\pi}{16}\right)x(i, 1)+\left(1+\frac{2\pi}{16}\right)x(i, 2)-\right.$$
$$\left(1-\frac{2\pi}{16}\right)x(i, 3)-\left(1-\frac{2\pi}{16}\right)x(i, 4)+$$
$$\left.\left(1+\frac{2\pi}{16}\right)x(i, 5)-\left(1+\frac{2\pi}{16}\right)x(i, 6)+\left(1-\frac{2\pi}{16}\right)x(i, 7)\right\}$$

$$\sum_{j=0}^{7} x(i, j)\zeta_j(7) = \qquad (25)$$

$$\frac{\sqrt{2}}{2}\left\{\left(1-\frac{3\pi}{16}\right)x(i, 0)-\left(1-\frac{\pi}{16}\right)x(i, 1)+\left(1+\frac{\pi}{16}\right)x(i, 2)-\right.$$
$$\left(1+\frac{3\pi}{16}\right)x(i, 3)+\left(1+\frac{3\pi}{16}\right)x(i, 4)-$$
$$\left.\left(1+\frac{\pi}{16}\right)x(i, 5)+\left(1-\frac{\pi}{16}\right)x(i, 6)-\left(1+\frac{2\pi}{16}\right)x(i, 7)\right\}$$

First Embodiment

Video Extraction in 2×2 Blocks

Having described the theoretical background of the present invention, a first embodiment thereof will now be described, which extracts 2×2 blocks of pixels for every 8×8 block input.

To provide a fast access to the content of compressed videos and enable low cost extraction of each video frame, the block of 8×8 pixels can be down-sampled by dividing the block size by a factor of $2^M$:M∈[1,3] along both its horizontal direction and vertical directions. This would give us three different sizes where a block is extracted with 1 pixel, 2×2 pixels and 4×4 pixels respectively. In fact, with 1 pixel a block, the frame can be extracted with DC coefficient only and thus the resulted value represents an average of all pixels inside the block. This is essentially ignoring all other AC coefficients when a block of pixels is reconstructed. Depending on the application, the quality of such extracted video frames would normally be unacceptable. This leaves us only two options, either extract the block in 2×2 pixels or in 4×4 pixels. Extraction of 2×2 pixels requires solving a group of 4 equations, and extraction of 4×4 pixels requires a group of 16 equations.

Choosing a block of 2×2 pixels for the first embodiment, the index value of j can be mapped into k∈[0,1] by merging {x(i,0), x(i,1), x(i,2), x(i,3)} into a single value {$\bar{x}$(i,0), and {x(i,4), x(i,5), x(i,6), x(i,7)} into {$\bar{x}$(i,1)}. This can be done by regarding each equation among (18-25) as a weighted summation. Although the weighting value varies between the equations, the overall average pixel can be approximately regarded the same, and hence the corresponding four pixels can be averaged and represented by one single value. In addition, since the maximum index value is 1 in this case, we only need two equations (18) and (19) to get the average pixel values, which can be arranged as follows:

$$\sum_{j=0}^{7} x(i, j)\zeta_1(0) = 4\left(\frac{x(i, 0) + x(i, 1) + x(i, 2) + x(i, 3)}{4}\right) + \qquad (26)$$
$$4\left(\frac{x(i, 4) + x(i, 5) + x(i, 6) + x(i, 7)}{4}\right)$$
$$= 4(\bar{x}(i, 0) + \bar{x}(i, 1))$$

$$\sum_{j=0}^{7} x(i, j)\zeta_1(1) = \frac{\sqrt{2}}{2}\left\{4 \times \frac{\left(1+\frac{3\pi}{16}\right)x(i, 0)+\left(1+\frac{\pi}{16}\right)x(i, 1)+\left(1-\frac{\pi}{16}\right)x(i, 2)+\left(1-\frac{3\pi}{16}\right)x(i, 3)}{\left(1+\frac{3\pi}{16}\right)+\left(1+\frac{\pi}{16}\right)+\left(1-\frac{\pi}{16}\right)+\left(1-\frac{3\pi}{16}\right)}\right\} - \qquad (27)$$
$$\left\{4 \times \frac{\left(1-\frac{3\pi}{16}\right)x(i, 4)+\left(1-\frac{\pi}{16}\right)x(i, 5)+\left(1+\frac{\pi}{16}\right)x(i, 6)+\left(1+\frac{3\pi}{16}\right)x(i, 7)}{\left(1-\frac{3\pi}{16}\right)+\left(1-\frac{\pi}{16}\right)+\left(1+\frac{3\pi}{16}\right)+\left(1+\frac{3\pi}{16}\right)}\right\}$$
$$\approx 2\sqrt{2}\,(\bar{x}(i, 0) - \bar{x}(i, 1))$$

Figure 2:
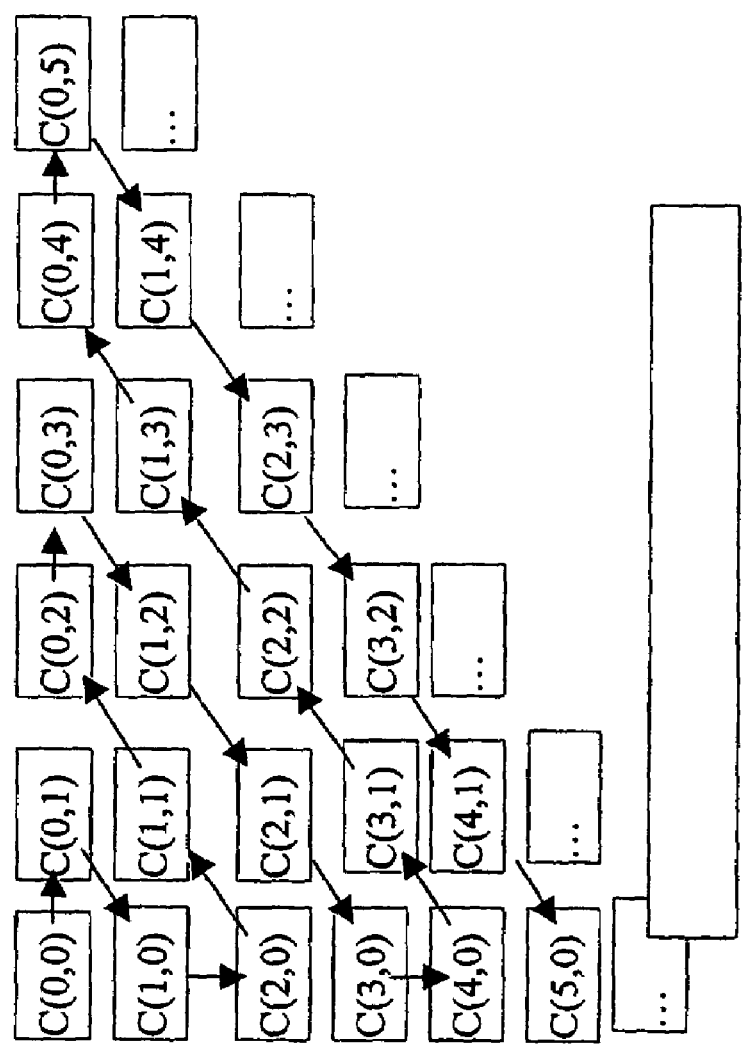
FIG. 2 is an illustration of how DCT coefficients generated from an 8×8 pixel block are read in a zig zag pattern during MPEG encoding.

Since this extraction only needs four equations, only four coefficients are needed. To maximise the extracted video quality and the cost savings, however, the following two conditions should be satisfied for those DCT coefficients selected:

(i) One index value should be preferably zero in order to reduce the number of multipliers inside the equation;
(ii) The coefficient should contain the highest possible energy along the zig-zag route as shown in FIG. 2.

By applying equations (26-27) along the row and column directions, respectively, we can therefore derive the following four formulas:

$$C(0,0) = \frac{1}{4} \times \frac{1}{\sqrt{2}} \times \frac{1}{\sqrt{2}} \times 4 \times 4\{\bar{x}(0,0) + \bar{x}(1,0) + \bar{x}(0,1) + \bar{x}(1,1)\} \quad (28)$$

$$C(0,1) = \frac{1}{4} \times \frac{1}{\sqrt{2}} \times 4 \times 2\sqrt{2}\{\bar{x}(0,0) + \bar{x}(1,0) - \bar{x}(0,1) + \bar{x}(1,1)\} \quad (29)$$

$$C(1,0) = \frac{1}{4} \times \frac{1}{\sqrt{2}} \times 2\sqrt{2} \times 4\{\bar{x}(0,0) - \bar{x}(1,0) + \bar{x}(0,1) - \bar{x}(1,1)\} \quad (30)$$

$$C(1,1) = \frac{1}{4} \times 2\sqrt{2} \times 2\sqrt{2}\{\bar{x}(0,0) - \bar{x}(1,0) - \bar{x}(0,1) + \bar{x}(1,1)\} \quad (31)$$

Solving these four equations, the average pixels are obtained as follows:

$$\bar{x}(0,0) = \frac{1}{8}\{C(0,0) + C(1,0) + C(0,1) + C(1,1)\} \quad (32)$$

$$\bar{x}(0,1) = \frac{1}{8}\{C(0,0) + C(1,0) - C(1,1) - C(0,1)\}$$

$$\bar{x}(1,0) = \frac{1}{8}\{C(0,0) - C(1,0) + C(0,1) - C(1,1)\}$$

$$\bar{x}(1,1) = \frac{1}{8}\{C(0,0) - C(1,0) - C(0,1) + C(1,1)\}$$

Let $$A_1 = (C_{00} + C_{10}) >> 3;\ A_2 = (C_{00} - C_{10}) >> 3;$$

$$B_1 = (C_{01} + C_{11}) >> 3;\ B_2 = (C_{01} - C_{11}) >> 3;$$

Then we have, using the short expression $\bar{x}_{ij}$ to replace $\bar{x}(i,j)$, $$\bar{x}_{00} = A_1 + B_1;\ \bar{x}_{01} = A_1 - B_1;\ \bar{x}_{10} = A_2 + B_2;\ \bar{x}_{11} = A_2 - B_2;$$

Figure 3:
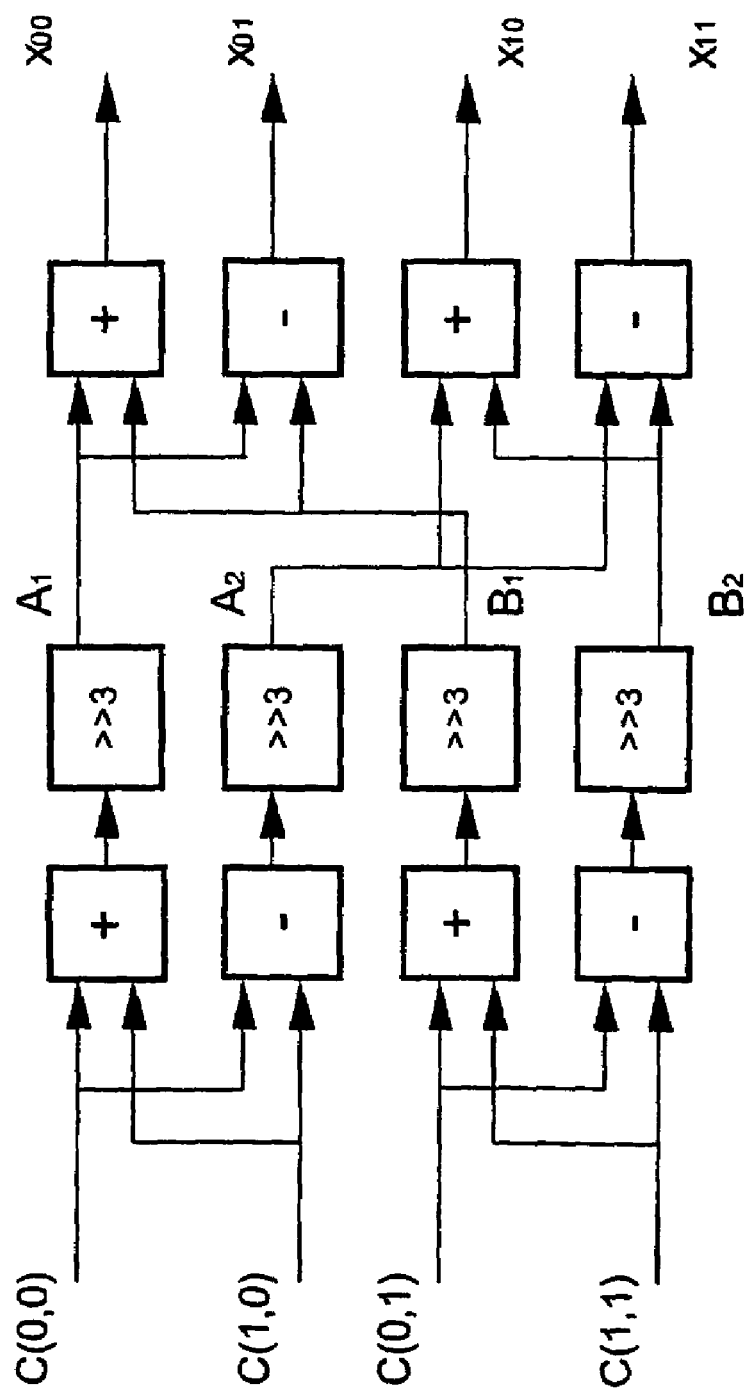
FIG. 3 is a block diagram showing the mathematical operations required to extract pixel values from DCT coefficients according to a first embodiment of the present invention.

A block implementation diagram is shown in FIG. 3, which illustrates the mathematical additions and subtractions which a decoder would have to perform according to the first embodiment. Note that these are the only operations a decoder according to the first embodiment has to perform in order to replace the inverse DCT transform that is conventionally used, and that the operations are performed directly on the DCT coefficient values shown to obtain the pixel values $X_{ab}$. It is clear that a block of 2×2 averaged pixels from the MPEG compressed codes can be extracted with only eight additions and four right-shift operations. Note that if only three DCT coefficients are used in equation (32) the computing cost can be reduced even further. From extensive experiments, this change only incurs slight distortion, which is difficult to notice in most cases. But the computing cost is now reduced to 6 additions and 4 right shifts. Therefore, the first embodiment of the invention provides that within an MPEG or JPEG decoder the entire IDCT block 10 as shown in FIG. 1 can be replaced by a hardware or software functional element which simply performs the mathematical operations shown in FIG. 3.

Furthermore, it should be noted that the equation set may be applied equally to not just the luminance value of a pixel to be extracted, but also to the chrominance values. Therefore, each of the luminance and chrominance values for a particular pixel may be directly extracted from the respectively relevant DCT coefficients using respectively appropriate equation sets.

Figure 8:
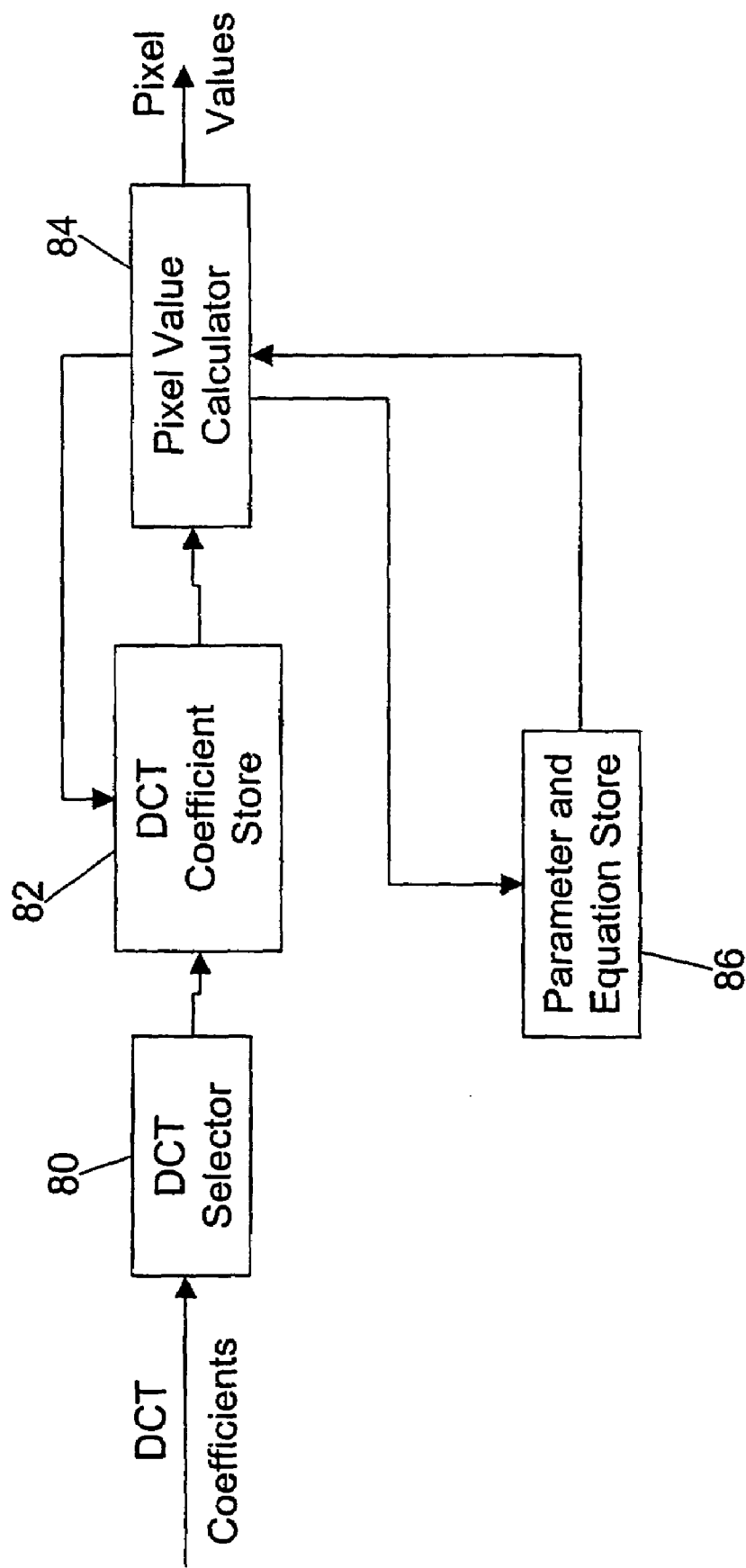
FIG. 8 is a block diagram of an apparatus according to an embodiment of the present invention.
Figure 9:
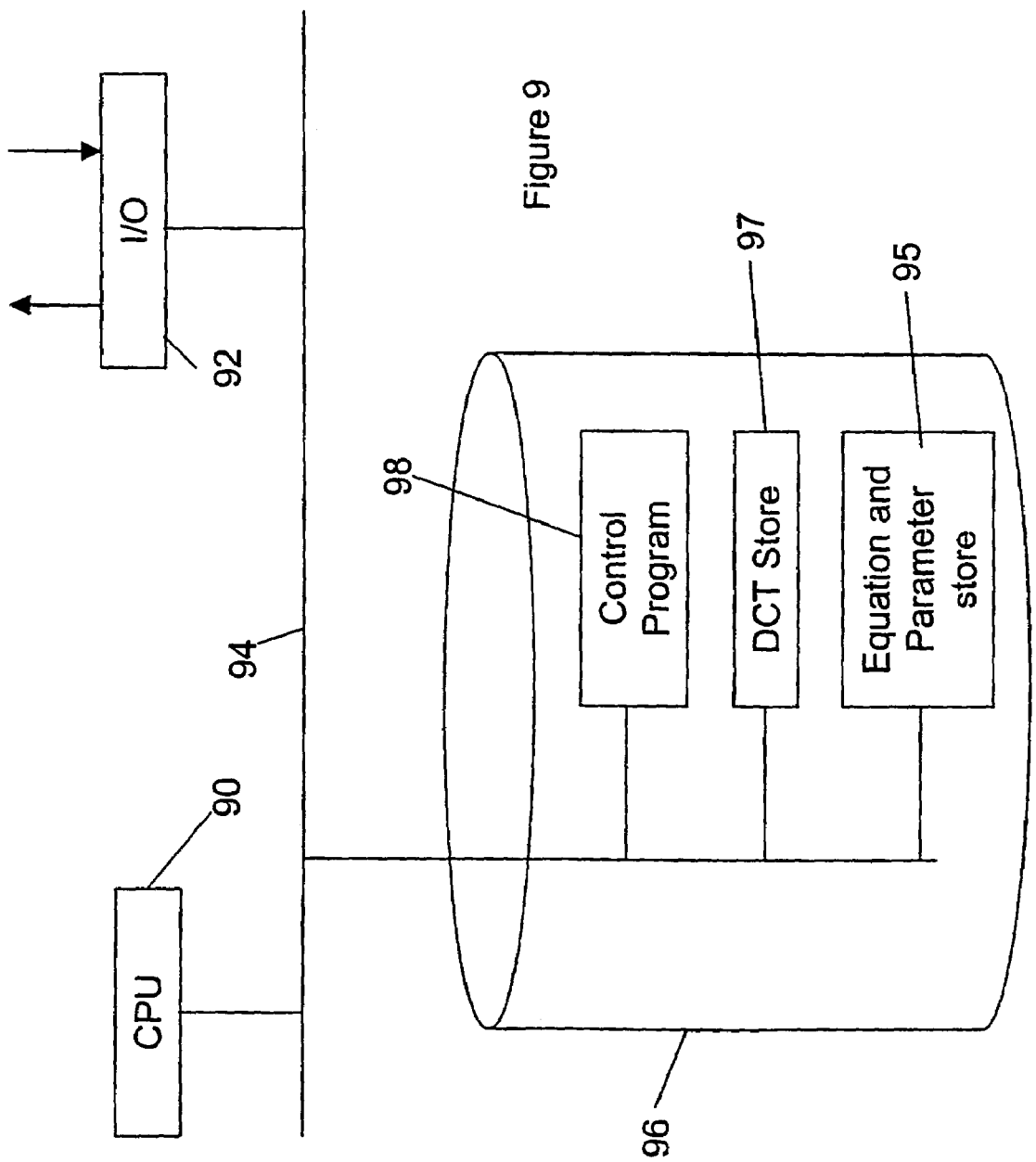
FIG. 9 is a block diagram of an alternative apparatus which may be used to implement the embodiments of the present invention.
Figure 10:
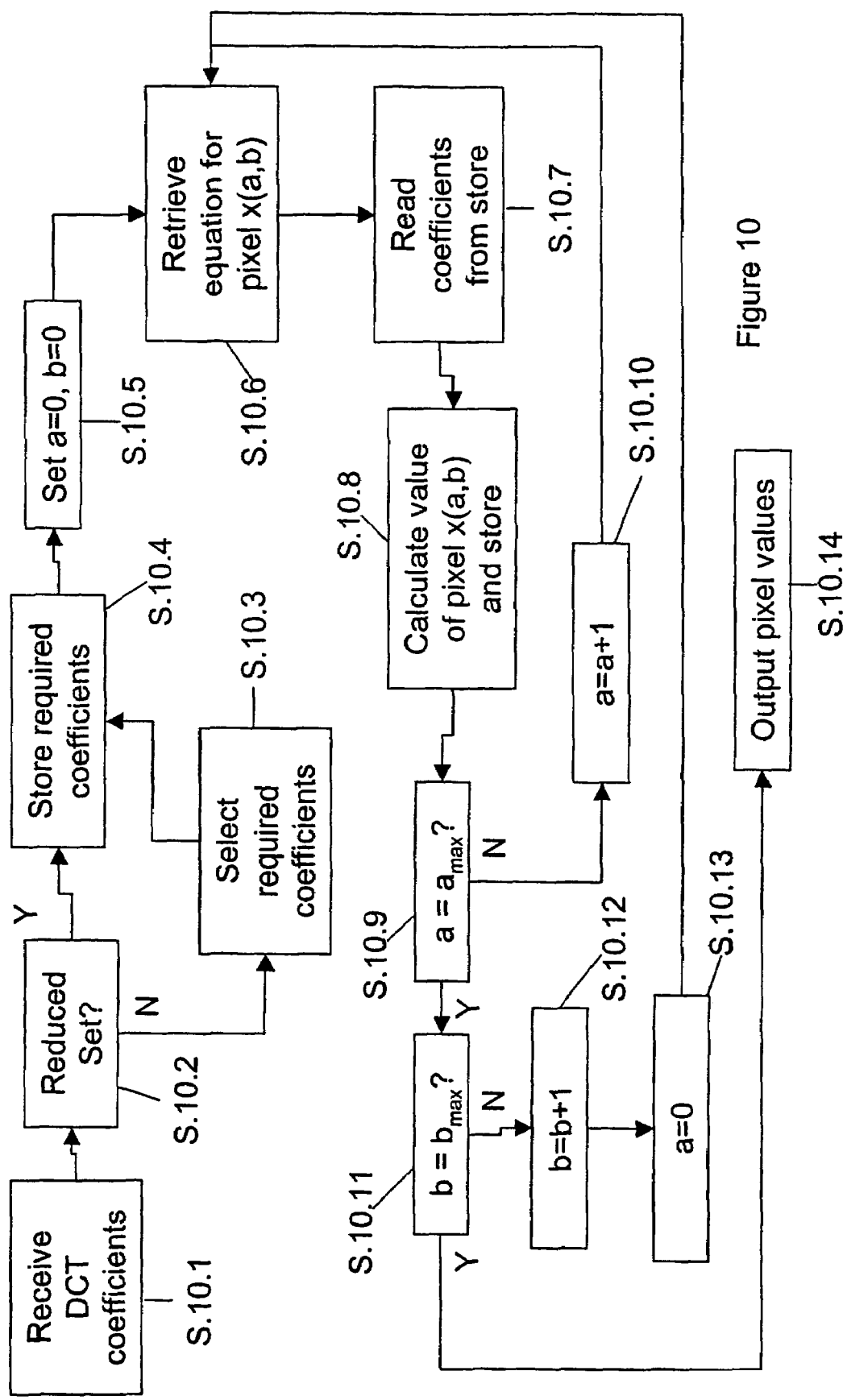
FIG. 10 is a flow diagram illustrating the steps involved in the operation of the present invention according to the embodiments.

Whilst FIG. 3 illustrates the mathematical operations and the orders in which they need to be performed according to the first embodiment of the invention, it should be understood that the invention may be implemented in either hardware or software. More particularly, we envisage it being possible to design a dedicated integrated circuit to be able to perform the operations of FIG. 3, but equally the embodiments of the invention may also be implemented via a programmable logic device such as an EPROM, an EEPROM, a field programmable gate array (FPGA), or the like. Furthermore, the invention is also readily implementable on software to run on an existing computer system. FIGS. 8 and 9 illustrate respective examples of possible implementations which may be applied to any of the embodiments of the present invention. FIG. 10 further illustrates the steps which may be performed by any of the embodiments of the present invention. FIGS. 8, 9, and 10 will now be described in more detail.

FIG. 8 illustrates a block diagram showing the function elements which would be required in a hardware implementation of the present invention. Note that the present invention intends to replace the inverse DCT operation of the prior art MPEG decoder, but that within such a decoder the other operations such as run-length and entropy decoding, and inverse quantization, as well as motion compensation will remain the same. Therefore, within the present invention we assume that other conventional elements of an MPEG or JPEG decoder are able to provide the actual DCT coefficient values for each pixel block as an input to the invention, and the invention will then output the extracted pixel values.

Therefore, as shown in FIG. 8 an apparatus according to any of the embodiments of the invention receives DCT coefficients as input, and the received coefficients are fed into a DCT selector 80. The DCT selector 80 selects those coefficients which are actually required to calculate pixel values, and discards the remainder. It may be, however, that the DCT coefficients fed to the selector are in fact a reduced set in the first place, in which case none are discarded. In such a case, it if were known in advance that a reduced set would be provided as an input, it would be possible to do without the selector 80. The selector 80 is therefore not essential to the operation of the invention.

The DCT selector 80 feeds the selected DCT coefficients to a DCT coefficients store 82, wherein they are stored. The DCT coefficients store 82 is arranged to be controlled by the pixel value calculator 84, and to pass DCT coefficients to the pixel value calculator as requested on command. The pixel value calculator 84 is further arranged to control a parameter and equation store 86, which stores the predetermined equations, such as for example, the equation set (32) in the first embodiment, which relate the DCT coefficient values directly to the pixel values to be output. The parameter and equation store 86 passes parameters and equations to the pixel value calculator as required on command therefrom.

The pixel value calculator 84 operates to calculate the pixel values using the parameters and equations stored in the equations store 86 directly from the DCT coefficient values passed thereto from the DCT coefficient store. The calculated pixel values are then output from the pixel value calculator 84 once calculated.

Whereas FIG. 8 is intended to relate to a hardware implementation of the present invention, as mentioned above the embodiments of the invention may also be implemented in software to run on a computer system, and the essential elements of the present invention with respect to a computer system are shown in FIG. 9. It will be apparent to the skilled man that FIG. 9 does not illustrate all the elements required for a computer system to operate, and is intended merely to show those elements of the computer system which would be specifically required by embodiments of the present invention.

With reference to FIG. 9, a computer system running the present invention includes a central processing unit 90 arranged to perform arithmetic and logical operations, and which communicates with other system elements via a central data bus 94. An input and output port 92 is provided connected to the data bus 94 to allow the input of DCT coefficients, and the output of calculated pixel values. A storage medium 96 which may be solid state memory, a hard disc, an optical disc, or the like, is provided in which is stored the usual operating system elements required to operate the computer system, as well as a control program 98, a storage area 97 for storing DCT coefficients, and a storage area 95 for storing the predefined equations and parameters which directly relate the DCT coefficients to the pixel values. The control program 98 when run on the CPU 90 causes the CPU to access the DCT store 97 and the equation and parameter store 95 as appropriate to calculate pixel values for output using the DCT coefficients received as the input.

FIG. 10 is a flow diagram illustrating the operation of either of the alternative implementations of FIG. 8 or 9, and which may be used by any of the embodiments of the invention.

Firstly, at step 10.1 DCT coefficients from which pixel values are to be extracted are received. Following this, at step 10.2 a check is made to see if a set of the DCT coefficients received for a pixel block is a reduced set, in that it only contains those DCT coefficients which are actually used in the calculations, or whether it is in fact still a full block of 64 coefficients. If it is determined that the received DCT coefficients are a reduced set thereof, then processing proceeds to step 10.4, else if the received DCT coefficient are a full set, processing proceeds to step 10.3.

At step 10.3, since a full set of DCT coefficients has been received, and only a sub set is required to calculate the pixel values, the required coefficients for calculation are selected and the remainder are discarded. Processing then proceeds to step 10.4, wherein the coefficients required for calculating the pixel values are stored in the DCT coefficient store 82, or 97.

Next, at step 10.5 two counters a, and b, are initiated to zero. These counters a and b are used to index into the parameter and equation stores 86 or 95 to retrieve the appropriate equation for each pixel valued to be calculated.

Following the initialisation of the counters, at step 10.6 the parameter and equation store 86 or 95 is accessed, and the appropriate equation for pixel x(a, b) is retrieved. The retrieved equation will contain certain DCT coefficients which are required for the calculation of the particular pixel value, and these coefficients are read from the DCT coefficients store 82 or 97 at step 10.7. Then, having retrieved the equation for the particular pixel whose value is being calculated, as well as the appropriate DCT coefficients required by the retrieved equation, at step 10.8 the equation and coefficients are used to calculate the value of the pixel x(a, b) and this value is then stored.

Following step 10.8, at step 10.9 an evaluation is made to check if the counter a has reached its maximum value a_max. The maximum value of a_max depends on the size of the pixel block which is to be extracted for an input block of DCT coefficients. For example, where, as in the case with the first embodiment, a 2×2 pixel block is extracted for every 8×8 block of DCT coefficients, then a_max will equal two. However, where a greater number of pixels are extracted for each input DCT coefficient block, then a_max will equal one of the dimensions of the pixel block of greater size.

If the evaluation at step 10.9 determines that a is not equal to a_max, then at step 10.10 the counter a is incremented, and processing then proceeds back to step 10.6 wherein the equation for pixel x(a, b) is retrieved and processing repeats.

If, however, it is determined at step 10.9 that a has reached its maximum value, then processing proceeds to step 10.11 wherein a similar evaluation is made for the counter b i.e. whether or not b has reached its maximum value b_max. Again, as with the counter a, the counter b is indicative of one dimension of the pixel block to be extracted for a given input DCT coefficient block, and may take a maximum value of, for example, 2 as in the first embodiment, or 4 as in the second and third embodiments.

If the evaluation of step 10.11 returns that b has reached its maximum value, then it must be the case that all of the pixel values to be extracted have been calculated, in which case processing proceeds to step 10.14, wherein the pixel values are output as a block of size a×b. However, if the evaluation of step 10.11 returns a negative, then at step 10.12 b is incremented, followed by the initialisation of the counter a back to zero at step 10.13, whereupon processing then proceeds back to step 6. Such a nested loop configuration will be familiar to the man skilled in the art, and allows for all of the pixels x(a, b) to be calculated by their appropriate respective equations to allow an output pixel block containing pixels whose values have been calculated in accordance with the embodiments of the invention to be output.

Further embodiments of the invention will now be described. It should be noted that the further embodiments will operate in substantially the same manner as previously described in this set of FIGS. 8, 9, and 10, and differ only in either the number of pixels which are extracted per input block of DCT coefficients (i.e. differ in respect of the set of equations which are used to calculate the output pixel values), or in the number of and particular DCT coefficients which are actually required in the calculation.

Second Embodiment

Video Extraction in 4×4 Blocks

A second embodiment of the invention will now be described, which extracts a 4×4 block of pixels from a 8×8 input block.

For extraction of 4×4 pixels, only equations (18-21) are required since the maximum index value is now 3. By averaging operation, $$\bar{x}(i, 0) = \frac{x(i, 0) + x(i, 1)}{2}, \quad \bar{x}(i, 1) = \frac{x(i, 2) + x(i, 3)}{2},$$

$$\bar{x}(i, 2) = \frac{x(i, 4) + x(i, 5)}{2}, \quad \bar{x}(i, 3) = \frac{x(i, 6) + x(i, 7)}{2}$$

Equations (18-21) can be similarly rearranged into:

$$\sum_{j=0}^{7} x(i, j)\zeta_j(0) = 2(\bar{x}(i, 0) + \bar{x}(i, 1) + \bar{x}(i, 2) + \bar{x}(i, 3)) \quad (33)$$

$$\sum_{j=0}^{7} x(i, j)\zeta_j(1) = \frac{\sqrt{2}}{2}\{(2+\frac{\pi}{4})\bar{x}(i, 0) + (2-\frac{\pi}{4})\bar{x}(i, 1) - \quad (34)$$
$$(2-\frac{\pi}{4})\bar{x}(i, 2) - (2+\frac{\pi}{4})\bar{x}(i, 3)\}$$
$$\approx \frac{\sqrt{2}}{2}\{(2+\frac{\pi}{4})\{2\bar{x}(i, 0) + \bar{x}(i, 1) - $$
$$\bar{x}(i, 2) - 2\bar{x}(i, 3)\}$$

$$\sum_{j=0}^{7} x(i, j)\zeta_j(2) = \sqrt{2}\{\bar{x}(i, 0) - \bar{x}(i, 1) - \bar{x}(i, 2) + \bar{x}(i, 3)\} \quad (35)$$

$$\sum_{j=0}^{7} x(i, j)\zeta_j(3) \approx \frac{\pi\sqrt{2}}{4\times 2}\{\bar{x}(i, 0) - 3\bar{x}(i, 1) + 3\bar{x}(i, 2) + \bar{x}(i, 3)\} \quad (36)$$

To obtain a group of 16 equations, we need to use 16 DCT coefficients $C(u,v):(u,v)\in[0,3]$. For each coefficient, by simply applying one of the equations (33-36) to both the horizontal and vertical directions, respectively, the corresponding equation can be derived. For example, to obtain the equation for $C(3,2)$, we first select (35) as the basis equation and then apply (36) to it to get the following expansion, using the short expression $\bar{x}_{ij}$ to replace $\bar{x}(i,j)$:

$$C(3, 2) = \frac{\pi}{16}\{(\bar{x}_{00} - 3\bar{x}_{10} + 3\bar{x}_{20} - \bar{x}_{30}) - (\bar{x}_{01} - 3\bar{x}_{11} + 3\bar{x}_{21} - \bar{x}_{31}) - \quad (37)$$
$$(\bar{x}_{02} - 3\bar{x}_{12} + 3\bar{x}_{22} - a_{32}) - (\bar{x}_{03} - 3\bar{x}_{13} + 3\bar{x}_{23} - \bar{x}_{33})\}$$

or, for efficiency, putting the non-integer multipliers to the left hand side, equation (37) is now expressed as, $$\frac{16}{\pi}C(3, 2) = \{(\bar{x}_{00} - 3\bar{x}_{10} + 3\bar{x}_{20} - \bar{x}_{30}) - (\bar{x}_{01} - 3\bar{x}_{11} + 3\bar{x}_{21} - \bar{x}_{31}) - $$
$$(\bar{x}_{02} - 3\bar{x}_{12} + 3\bar{x}_{22} - \bar{x}_{32}) - (\bar{x}_{03} - 3\bar{x}_{13} + 3\bar{x}_{23} - \bar{x}_{33})\}$$

Following similar operations, all the 16 DCT coefficients can be worked out. This resulting set of linear equations can be arranged in the following matrix form:

$$[C_T]=[\tilde{A}][\bar{x}] \quad (38)$$

where $[C_T]$ is the vector containing transformed 16 DCT coefficient shown in equation (39), $$[C_T] = \left[2C_{00}, \frac{4C_{10}}{(2-\frac{\pi}{4})}, 2C_{20}, \frac{16C_{30}}{\pi}, \frac{4C_{01}}{(2-\frac{\pi}{4})}, \right. \quad (39)$$
$$\frac{8C_{11}}{(2-\frac{\pi}{4})^2}, \frac{4C_{21}}{(2-\frac{\pi}{4})}, \frac{32C_{31}}{(2-\frac{\pi}{4})\pi}, 2C_{02}, \frac{4C_{12}}{(2-\frac{\pi}{4})}, 2C_{22},$$
$$\left. \frac{16C_{32}}{\pi}, \frac{16C_{03}}{\pi}, \frac{32C_{13}}{(2-\frac{\pi}{4})\pi}, \frac{16C_{23}}{\pi}, \frac{16\times 8C_{33}}{\pi^2} \right]$$

Figure 6:
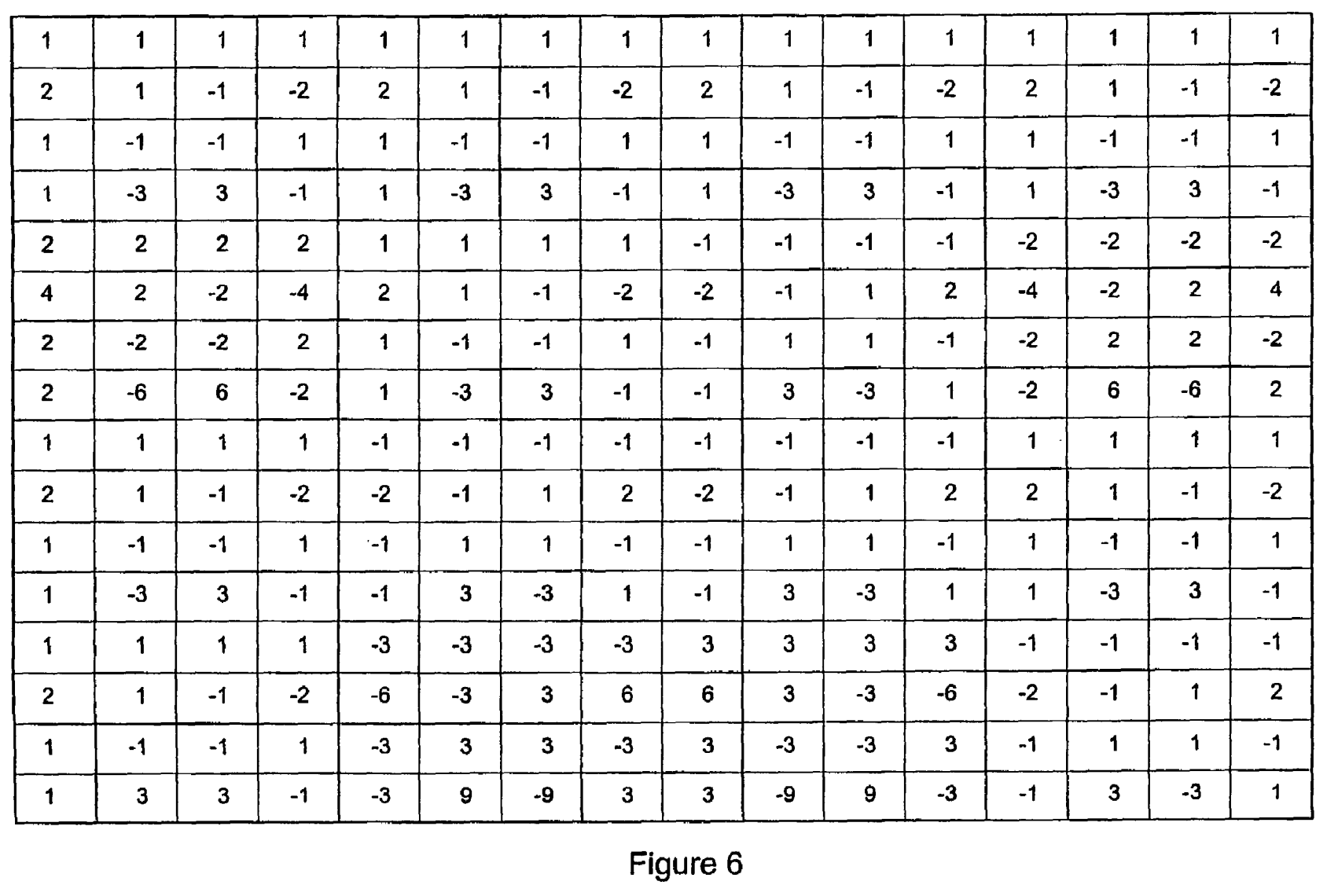

$[\bar{x}]$ is the 16-dimensional vector containing the weighted averaging pixels arranged in the order of $\bar{x}_{00}$ to $\bar{x}_{33}$ and $[\tilde{A}]$ is the resulting 16×16 parameter matrix, which is illustrated in FIG. 6.

So, $[C_T]=[T][C_{uv}]$, after multiplying both sides of (38) by the inverse matrix $[\tilde{A}]^{-1}$, the pixel vector can be extracted via:

$$[\bar{x}]=[B][C_{uv}] \quad (40)$$

Where $[B]=[\tilde{A}]^{-1}[T]$ is listed in FIGS. 7(a) and (b), from which we have: $0.125=\frac{1}{8}$, $0.0625=\frac{1}{16}$, $0.25=\frac{1}{4}$, which are essentially the right shift operations by 3, 4, and 2 bits respectively. As a result, the video extraction for 4×4 blocks can be implemented in three optional schemes.

The first scheme only considers 4 coefficients $C_{uv}:(u,v)\in \{(0,0), (0,1), (1,0), (2,0)\}$. All pixels can be extracted via the following equations:

$\bar{x}_{00}=C_{00}>>3+0.176C_{10}+C_{20}>>3+0.176C_{01}$ $\bar{x}_{10}=C_{00}>>3+(C_{10}>>4)-(C_{20}>>3)+0.176C_{01}$ $\bar{x}_{20}=C_{00}>>3-(C_{10}>>3)-(C_{20}>>3)+0.176C_{01}$ $\bar{x}_{30}=C_{00}>>3-0.176C_{10}+(C_{20}>>3)+0.176C_{01}$ $\bar{x}_{01}=C_{00}>>3+0.176C_{10}+(C_{20}>>3)+(C_{01}>>4)$ $\bar{x}_{11}=C_{00}>>3+(C_{10}>>4)-(C_{20}>>3)+(C_{01}>>4)$ $\bar{x}_{21}=C_{00}>>3-(C_{10}>>4)+(C_{20}>>3)+(C_{01}>>4)$ $\bar{x}_{31}=C_{00}>>3-0.176C_{10}+(C_{20}>>3)+(C_{01}>>4)$ $\bar{x}_{02}=C_{00}>>3+0.176C_{10}-(C_{20}>>3)-(C_{01}>>4)$ $\bar{x}_{12}=C_{00}>>3+(C_1>>4)-(C_{20}>>3)-(C_{01}>>4)$ $\bar{x}_{22}=C_{00}>>3-(C_{10}>>4)-(C_{20}>>3)-(C_{01}>>4)$ $\bar{x}_{32}=C_{00}>>3-0.176C_{10}+(C_{20}>>3)-(C_{01}>>4)$ $\bar{x}_{03}=C_{00}>>3+0.176C_{10}+(C_{20}>>3)-0.176C_{01}$ $\bar{x}_{13}=C_{00}>>3+C_{10}>>4-(C_{20}>>3)-0.176C_{01}$ $\bar{x}_{23}=C_{00}>>3-(C_{10}>>4)-(C_{20}>>3)-0.176C_{01}$ $\bar{x}_{33}=C_{00}>>3-0.176C_{10}-(C_{20}>>3)-0.176C_{01}$ (41)

Within the above equations, the notation $C_{ab}>>x$ refers to right shifting the binary representation of the DCT coefficient $C_{ab}$ by x bits, thereby effectively discarding the x least significant bits. As will be understood by the intended reader, such an operation approximates dividing the value of the DCT coefficient by $2^x$, without an actual arithmetic divide operation having to be performed.

Figure 4:
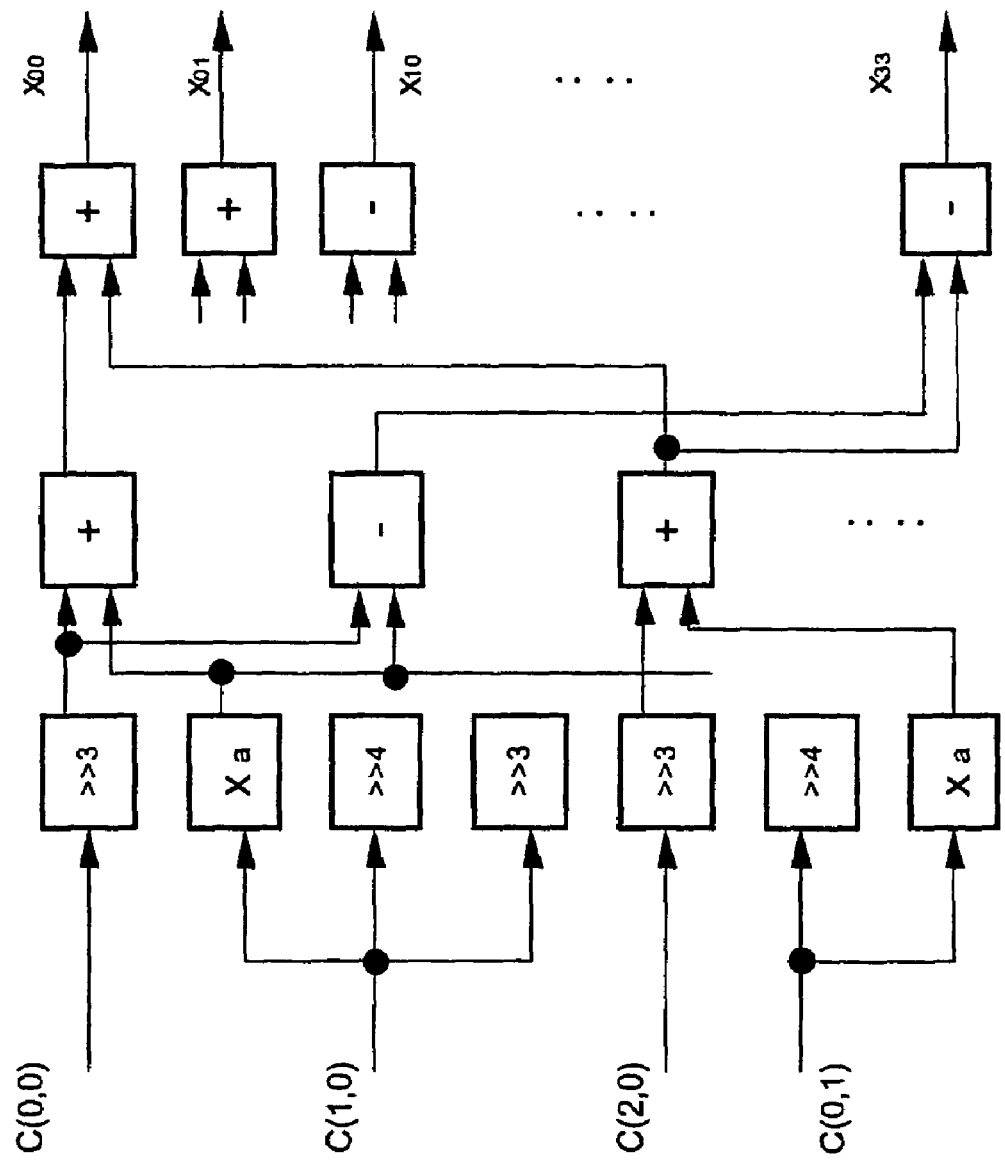
FIG. 4 is a block diagram showing at least some of the mathematical operations required to extract pixel values directly from DCT coefficients in a second embodiment of the present invention.

An incomplete three-stage implementation block diagram for the second embodiment is given in FIG. 4, which shows some of the mathematical operations required to implement the equation set above. It should be apparent which further operations are required from the above equation set. As with the first embodiment, the above equation set replaces the need for an inverse DCT to be performed at the MPEG decoder, and therefore, the second embodiment of the invention also provides that within an MPEG or JPEG decoder the entire IDCT block 10 as shown in FIG. 1 can be replaced by a hardware or software functional element which simply performs the mathematical operations partially shown in FIG. 4, and fully described by the above equations. It has been found that this scheme only requires 2 multiplications and 28 additions, yet the extracted video frame quality is much better than that of the extraction in 2×2 blocks, where four coefficients are also used, though the fourth one used is different. Examples of results obtained by the present invention are discussed in more detail later.

Third Embodiment

The third embodiment is similar to the second embodiment in that it extracts pixels in 4×4 blocks for each 8×8 block of DCT coefficients input thereto, but differs from the second embodiment in that it considers 9 coefficients, $C_{uv}:(u,v)\epsilon[0,2]$. The 16 pixels can be extracted by the following equations:

$\bar{x}_{00}=A_{1+3}>>3+0.176(B_3+B_1+C_{11})$ $\bar{x}_{10}=A_{2+4}>>3+0.176B_2+(B_3>>4)+(C_{11}>>4)$ $\bar{x}_{20}=A_{2+4}>>3+0.176B_2-(B_3>>4)-(C_{11}>>4)$ $\bar{x}_{30}=A_{1+3}>>3-(B_3-B_1)>>4-(C_{11}>>4)$ $\bar{x}_{01}=A_{1-3}>>3+0.176B_3+(B_1>>4)+(C_{11}>>4)$ $\bar{x}_{11}=A_{2-4}>>3+(B_4+B_2)>>4$ $\bar{x}_{21}=A_{2-4}>>3-(B_4-B_2)>>4$ $\bar{x}_{31}=A_{1-3}>>3-0.176B_4+(B_1>>4)+(C_{11}>>4)$ $\bar{x}_{02}=A_{1-3}>>3+0.176B_4-(B_1>>4)-(C_{11}>>4)$ $\bar{x}_{12}=A_{2-4}>>3+(B_4>>4)-(B_2>>4)$ $\bar{x}_{22}=A_{2-4}>>3-(B_4+B_2)>>4$ $\bar{x}_{32}=A_{1-3}>>3-0.176B_4-(B_1>>4)+(C_{11}>>4)$ $\bar{x}_{03}=A_{1+3}>>3+0.176(B_4-B_1-C_{11})$ $\bar{x}_{13}=A_{2+4}>>3-0.176B_2+B_3>>4-(C_{11}>>4)$ $\bar{x}_{23}=A_{2+4}>>3-0.176B_2-(B_3>>4)+(C_{11}>>4)$ $\bar{x}_{33}=A_{1+3}>>3-0.176(B_4+B_1-C_{11})$ (42)

Where:

$A_{1+3}=A_1+A_3; A_{1-3}=A_1-A_3; A_{2+4}=A_2+A_4; A_{2-4}=A_2-A_4;$ $A_1=C(0,0)+C(2,0); A_2=C(0,0)-C(2,0);$ $A_3=C(0,2)+C(2,2); A_4=C(0,2)-C(2,2)$ $B_1=C(0,1)+C(2,1); B_2=C(0,1)-C(2,1);$ $B_3=C(1,0)+C(1,2); B_4=C(1,0)-C(1,2);$

Figure 5:
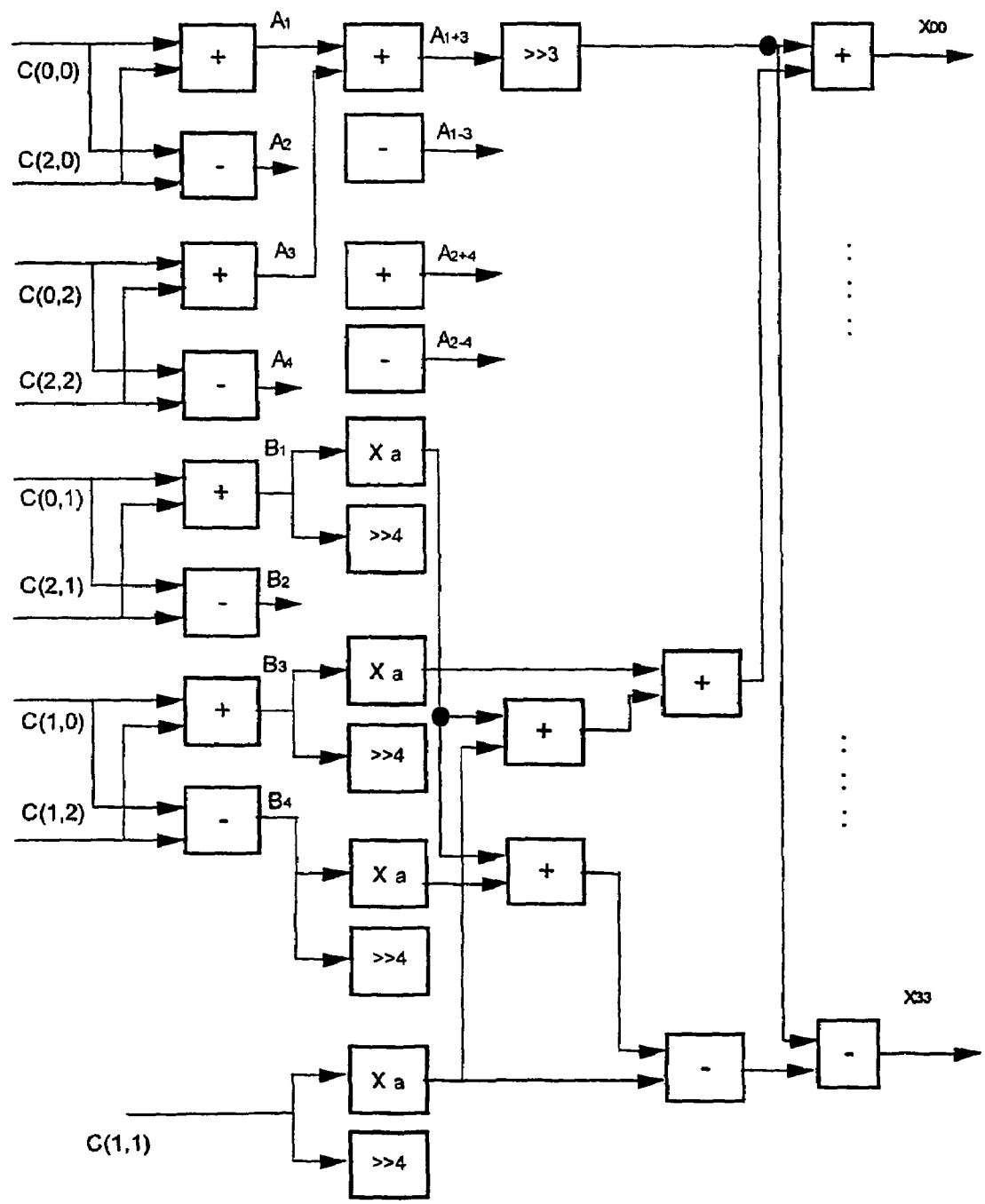
FIG. 5 is a block diagram showing some of the mathematical operations required to extract pixel values from DCT coefficients in a third embodiment of the present invention.

An incomplete implementation block diagram is given in FIG. 5, whence it will be seen that the structure is extremely simple. As with the second embodiment, the operations not shown in FIG. 5 should be apparent from the equation set above. As with both the first and second embodiments, the above equation set replaces the need for an inverse DCT to be performed at the MPEG decoder, and therefore, the third embodiment of the invention also provides that within an MPEG or JPEG decoder the entire IDCT block 10 as shown in FIG. 1 can be replaced by a hardware or software functional element which simply performs the mathematical operations partially shown in FIG. 5, and fully described by the above equations. It is found that the total computing cost of the third embodiment now amounts to 5 multiplication, 42 addition and 9 right shifts. If 0.176x is approximated by (x>>3)+(x>>5), the computing cost becomes 47 additions and 19 right shifts, but with no multiplication. From visual inspection, these two implementations do not show any noticeable difference.

Fourth Embodiment

The fourth embodiment is closely related to the third embodiment, but considers all the 16 coefficients $C_{uv}:(u,v)\epsilon[0,3]$. However, the inclusion of all 16 coefficients almost doubles the number of additions and multiplications. The almost unnoticed visual quality difference between the two schemes does not justify such an increase in computational complexity, and hence the fourth embodiment is not preferred.

To include the other seven coefficients dropped previously, the pixel extraction equations are modified as follows:

$\bar{x}_{00} = 0.085(C_{30} + C_{32}) + 0.085(C_{03} + C_{23}) + \frac{1}{8}(C_{31} + C_{13}) + \frac{1}{16}C_{33}$ $\bar{x}_{10} = -0.18(C_{30} + C_{32}) + 0.085(C_{03} - C_{23}) - \frac{1}{4}C_{31} + 0.042C_{13} - \frac{1}{8}C_{33}$ $\bar{x}_{20} = 0.18(C_{30} + C_{32}) + 0.085(C_{03} - C_{23}) + \frac{1}{4}C_{31} - 0.042C_{13} + \frac{1}{8}C_{33}$ $\bar{x}_{30} = -0.085(C_{30} + C_{32}) + 0.085(C_{03} + C_{23}) + \frac{1}{8}(C_{31} + C_{13}) - \frac{1}{16}C_{33}$ $\bar{x}_{01} = 0.085(C_{30} - C_{32}) - 0.18(C_{03} + C_{23}) + 0.042C_{31} - \frac{1}{4}C_{13} + \frac{1}{8}C_{33}$ $\bar{x}_{11} = -0.18(C_{30} - C_{32}) - 0.18(C_{03} - C_{23}) - 0.085(C_{31} + C_{13}) + \frac{1}{4}C_{33}$ $\bar{x}_{21} = 0.18(C_{30} - C_{32}) - 0.18(C_{03} - C_{23}) + 0.085(C_{31} + C_{13}) - \frac{1}{4}C_{33}$ $\bar{x}_{31} = -0.085(C_{30} - C_{32}) - 0.18(C_{03} + C_{33}) - 0.042C_{31} + \frac{1}{4}C_{13} + \frac{1}{8}C_{33}$ $\bar{x}_{02} = 0.085(C_{30} - C_{32}) + 0.18(C_{03} + C_{23}) - 0.042C_{31} + \frac{1}{4}C_{13} + \frac{1}{8}C_{33}$ $\bar{x}_{12} = -0.18(C_{30} - C_{32}) + 0.18(C_{03} - C_{23}) + 0.085(C_{31} + C_{13}) - \frac{1}{4}C_{33}$ $\bar{x}_{22} = 0.18(C_{30} - C_{32}) + 0.18(C_{03} - C_{23}) - 0.085(C_{31} + C_{13}) + \frac{1}{4}C_{33}$ $\bar{x}_{32} = -0.085(C_{30} - C_{32}) + 0.18(C_{03} + C_{23}) + 0.042C_{31} - \frac{1}{4}C_{13} - \frac{1}{8}C_{33}$ $\bar{x}_{03} = 0.085(C_{30} + C_{32}) - 0.085(C_{03} + C_{23}) + \frac{1}{8}(C_{31} + C_{13}) - \frac{1}{16}C_{33}$ $\bar{x}_{13} = -0.18(C_{30} + C_{32}) - 0.085(C_{03} - C_{23}) + \frac{1}{4}C_{31} - 0.042C_{13} + \frac{1}{8}C_{33}$ $\bar{x}_{23} = 0.18(C_{30} + C_{32}) - 0.085(C_{03} - C_{23}) - \frac{1}{4}C_{31} + 0.042C_{13} - \frac{1}{8}C_{33}$ $\bar{x}_{33} = -0.085(C_{30} + C_{32}) - 0.085(C_{03} + C_{23}) + \frac{1}{8}(C_{31} + C_{13}) + \frac{1}{16}C_{33}$ As with the previous embodiments, the above equation set replaces the need for an inverse DCT to be performed at the MPEG decoder, and therefore, the fourth embodiment of the invention also provides that within an MPEG or JPEG decoder the entire IDCT block 10 as shown in FIG. 1 can be replaced by a hardware or software functional element which simply performs the mathematical operations described by the above equations. The implementation cost for the above equations are 45 additions and 17 right shift operations if the three real numbers, 0.085, 0.042 and 0.18, are approximated, respectively, by ⅟16, ⅟32, and ⅛. However, as mentioned above the use of these extra seven coefficients does not produce any noticeable improvement on the quality of its extracted frames, and hence this scheme is excluded from further discussions.

In summary, therefore, according to the embodiments of the present invention four video extraction schemes are provided, in which three schemes extract video frames in 4×4 blocks using respectively, 4, 9, and 16 DCT coefficients, and one scheme extracts video frames in 2×2 blocks using 4 DCT coefficients. It should be understood that the four embodiments are mere examples, and similar schemes which produce blocks of different sizes using greater or lesser numbers of DCT coefficients can be designed by applying the mathematical principles of the present invention as described herein, and that such alternative schemes are intended to be encompassed within the present invention.

Results

Figure 11:
FIGS. 11(a), (b), and (c) are respectively frames extracted using the first embodiment of the present invention.
Figure 11:
Figure 11:
Figure 12:
FIGS. 12(a), (b), and (c) are respectively frames extracted by the second embodiment of the present invention.
Figure 12:
Figure 12:

The results provided by the first to third embodiments of the present invention will now be described with reference to the example frames (a), (b) and (c) shown in each of FIGS. 11, 12, 13, and 14. More particularly, FIG. 11 illustrates three frames generated by the first embodiment, FIG. 12 illustrates the same three frames when generated by the second embodiment, and FIG. 13 illustrates the frames when generated according to the third embodiment. For comparison, FIG. 14 shows the same frames extracted using a full IDCT of the prior art, down-sampled by 2 from the original size of 288×352 for comparison with the extracted frames at the same size.

In order to generate the images mentioned above, each of the embodiments was implemented in a Microsoft® Visual C++ environment based on C source code of an original MPEG-2 decoder downloaded from Internet. In this respect therefore, the specific implementation therefore corresponds to the software implementation described previously with respect to FIG. 9. In order to ensure a fair comparison, moreover, each frame has been enlarged to the same size, this enlargement being accomplished by simply repeating the same pixel along both the horizontal and vertical directions respectively until the required size is reached. Thus, where a 2×2 pixel block is extracted for each 8×8 block of DCT coefficients input thereto, in order to enlarge the extracted pixels to the same size as the source image each pixel is repeated vertically four times and horizontally four times, resulting in 16 identical pixels. Where a 4×4 block has been extracted, each pixel need only be repeated twice in each direction. This mode of enlargement of simply repeating pixels provided by the invention is computationally straightforward, and carries very little overhead cost, thus allowing the enlargement to be performed without compromising the increase in computational efficiency which is gained using the direct pixel extraction technique of the invention.

After extensive playback and comparisons between still video frames, we have observed that the quality of video images in terms of visual perception is almost the same as that of fully IDCT decompressed with all the 64 DCT coefficients if the extracted video is played back in its extracted size. For enlarged size playback, the quality is acceptable although slight distortion may be observed for some frames. For example, it will be seen from FIG. 11 which was generated by the first embodiment that the resolution is noticeably less than the other examples. However, from FIG. 13 generated using the third embodiment hardly any noticeable difference arises with the frames generated using the full IDCT.

From the experimental results and visual comparisons, the following further conclusions can be made for the video extraction algorithms:

The two video extraction algorithms of the first and third embodiments achieve close-to-fully decompressed video image quality with the extracted size playback, or H/4×W/4 for the first embodiment and H/2×W/2 for the third embodiment.

For the second embodiment, the extracted size playback has acceptable perceptual quality in comparison with the fully decompressed video frames, and achieves better quality than that of the first embodiment. Note that both schemes use 4 DCT coefficients, though the fourth one being different $C_{20}$ vs. $C_{11}$;

Video extraction in 2×2 blocks, or the first embodiment, maintains acceptable perceptual quality for H/2×W/2 playback;

Video extraction in 4×4 blocks, or the third embodiment, can afford full size video frame playback with acceptable perceptual quality.

For illustrative purposes, Table 1 summarises the computational cost (but not complexity) for the three video extraction schemes studied and other fast IDCT computing algorithms quoted in the literature.

TABLE 1

Summary of computational cost for various algorithms

| Video extraction scheme | Extracted size (original block size 8 × 8 pels) | DCT coefficients involved | multiply | addition | Right shift |
|---|---|---|---|---|---|
| First embodiment | 2 × 2 | 4-(00 01 10 11) | — | 8 | 4 |
| Second embodiment | 4 × 4 | 4-(00 01 10 20) | 2 | 28 | 5 |
| Third embodiment | 4 × 4 | 9-(00-33) | 5 | 42 | 9 |
|  |  |  | — | 47 | 19 |
| Full IDCT | 8 × 8 | All 64 | 192 | 464 | — |
| [a] | 8 × 8 | 64 | 104 | 462 |  |
| [b] | 8 × 8 | 64 | 96 | 484 |  |
| [c] | 8 × 8 | 64 | 96 | 466 |  |

Within the table the references [a], [b], and [c] respectively relate to the prior published articles: M. Vetterli, "Fast 2-D discrete cosine transform," in *Proc. ICASSP'85*, March, 1985; P. Duhamel and C. Guillemot, "Polynomial transform computation of 2-D DCT," in *Proc. ICASSP'90*, pp. 1515-1518, April, 1990; and N. I. Cho and S. U. Lee, "Fast algorithm and implementation of 2-D discrete cosine transform," *IEEE Trans. Circuits Syst.*, vol. CAS-40, pp. 259-266, April, 1991, which each describe prior art examples of fast inverse DCT operations.

The results in the Table are commented upon as follows: It is noted particularly that the claims for fast IDCT implementation in references [a-c] need to be verified carefully by theoretical examination as well as software implementation. The fast speed does not necessarily mean low implementation complexity. The majority of fast IDCT computing still incurs high computational complexity. This is because the fastness was measured only by the number of multiplication and additions, yet other background computing was ignored such as re-ordering of those coefficients or pixels, pre-calculating or pre-storing large amount of real-numbers etc. Consequently, large memory consumption could be required. So, most of these published fast IDCT computing algorithms are not fast without paying prices. In contrast, the techniques invented here can be easily verified to have genuinely low cost, simply because the structure of their implementation is so simple that anybody without any knowledge of DCT can easily follow. There is no background computing, no any other movement of those coefficients or pixels, and no additional memory consumption. Furthermore, the only five multiplications required for the third embodiment can be replaced by 10 right shifts. This means that no multiplication is required at all. Yet the perceptual quality is competitive and very close to that of fully decompressed in the extracted size display. We do not think any fast IDCT-based fast computing could possibly achieve this.

The present invention therefore presents methods and apparatuses that allow for pixel values to be extracted directly from the DCT coefficients of an encoded MPEG or JPEG image, without having to undergo an inverse DCT. The computational efficiency of the invention is much improved with respect to prior art fast IDCT techniques, and the ability to use only a subset of the generated DCT coefficients means that the bandwidth required for the future transmission of MPEG and JPEG encoded images and video will be much reduced. There are many potential future applications of the invention, and we envisage the application of the techniques provided by the invention in any future device where it is desirable to achieve fast and efficient extraction of images from the DCT domain.

The invention claimed is:

1. A method of extracting pixel values from a signal comprising a plurality of discrete cosine transform (DCT) coefficients derived from values of pixels in a source image, the method comprising:
   storing a plurality of pre-calculated weighting factors; and
   for any particular pixel value to be extracted, calculating the pixel value as a weighted sum of selected ones of the coefficients, except in the case of a weighting factor that is close to a power of two, the power of two itself is used, and the weighting is implemented by binary shifting.

2. A method according to claim 1, wherein an extracted pixel value is an average value of respective values of a set of pixels in the source image.

3. A method according to claim 1, wherein the DCT coefficients are derived from a block of a by b pixels in the source image, and for the block a total of a/x by b/y pixels are extracted.

4. A method according to claim 3, wherein a=b=8, and x=y∈{2,4}.

5. An apparatus according to claim 3, wherein a=b=8, and x=y∈{2,4}.

6. A method according to claim 1, wherein the DCT coefficients used in the calculating step are those which are representative of the highest energy with respect to the DCT transform.

7. A computer readable medium containing a computer program for extracting pixel values from a signal comprising a plurality of discrete cosine transform (DCT) coefficients derived from values of pixels in a source image, the computer program comprising instructions which when executed on a computer cause the computer to operate in accordance with the method of claim 1.

8. An apparatus according to claim 1, wherein the DCT coefficients are derived from a block of a by b pixels in the source image, and for each block a total of a/x by b/y pixels are extracted.

9. A method of extracting pixel values from a signal comprising plurality of discrete cosine transform (DCT) coefficients derived from values of pixels in a source image, the method comprising:

storing a plurality of pre-calculated parameters, each of which is associated with a particular pixel whose value is to be extracted; and for any particular pixel value to be extracted, calculating the pixel value using the pre-calculated parameters associated therewith together with one or more of the DCT coefficients;

wherein for a block of 8 by 8 DCT coefficients, a block of 2 by 2 pixels are extracted, the pixel values being calculated in accordance with the following equations:

$$\bar{x}(0,0) = \frac{1}{8}\{C(0,0) + C(1,0) + C(0,1) + C(1,1)\}$$

$$\bar{x}(0,1) = \frac{1}{8}\{C(0,0) + C(1,0) - C(1,1) - C(0,1)\}$$

$$\bar{x}(1,0) = \frac{1}{8}\{C(0,0) - C(1,0) + C(0,1) - C(1,1)\}$$

$$\bar{x}(1,1) = \frac{1}{8}\{C(0,0) - C(1,0) - C(0,1) + C(1,1)\}$$

wherein x(i,j) is the extracted value of pixel (i,j), and C(u,v) is the DCT coefficient (u,v) with respect to the block of DCT coefficients.

10. A method of extracting pixel values from a signal comprising plurality of discrete cosine transform (DCT) coefficients derived from values of pixels in a source image, the method comprising:

storing a plurality of pre-calculated parameters, each of which is associated with a particular pixel whose value is to be extracted; and for any particular pixel value to be extracted, calculating the pixel value using the pre-calculated parameters associated therewith together with one or more of the DCT coefficients;

wherein for a block of 8 by 8 DCT coefficients, a block of 4 by 4 pixels are extracted, the pixel values being calculated in accordance with the following equations, wherein x(i,j) is the extracted value of pixel (i,j), C(u,v) is the DCT coefficient (u,v) with respect to the block of DCT coefficients, and >>x represents an effective divide by $2^x$:

$\bar{x}_{00} = C_{00} >> 3 + 0.176 C_{10} + C_{20} >> 3 + 0.176 C_{01}$ $\bar{x}_{10} = C_{00} >> 3 + (C_{10} >> 4) - (C_{20} >> 3) + 0.176 C_{01}$ $\bar{x}_{20} = C_{00} >> 3 - (C_{10} >> 3) - (C_{20} >> 3) + 0.176 C_{01}$ $\bar{x}_{30} = C_{00} >> 3 - 0.176 C_{10} + (C_{20} >> 3) + 0.176 C_{01}$ $\bar{x}_{01} = C_{00} >> 3 + 0.176 C_{10} + (C_{20} >> 3) + (C_{01} >> 4)$ $\bar{x}_{11} = C_{00} >> 3 + (C_{10} >> 4) - (C_{20} >> 3) + (C_{01} >> 4)$ $\bar{x}_{21} = C_{00} >> 3 - (C_{10} >> 4) + (C_{20} >> 3) + (C_{01} >> 4)$ $\bar{x}_{31} = C_{00} >> 3 - 0.176 C_{10} + (C_{20} >> 3) + (C_{01} >> 4)$ $\bar{x}_{02} = C_{00} >> 3 + 0.176 C_{10} - (C_{20} >> 3) - (C_{01} >> 4)$ $\bar{x}_{12} = C_{00} >> 3 + (C_{1} >> 4) - (C_{20} >> 3) - (C_{01} >> 4)$ $\bar{x}_{22} = C_{00} >> 3 - (C_{10} >> 4) - (C_{20} >> 3) - (C_{01} >> 4)$ $\bar{x}_{32} = C_{00} >> 3 - 0.176 C_{10} + (C_{20} >> 3) - (C_{01} >> 4)$ $\bar{x}_{03} = C_{00} >> 3 + 0.176 C_{10} + (C_{20} >> 3) - 0.176 C_{01}$ $\bar{x}_{13} = C_{00} >> 3 + C_{10} >> 4 - (C_{20} >> 3) - 0.176 C_{01}$ $\bar{x}_{23} = C_{00} >> 3 - (C_{10} >> 4) - (C_{20} >> 3) - 0.176 C_{01}$ $\bar{x}_{33} = C_{00} >> 3 - 0.176 C_{10} - (C_{20} >> 3) - 0.176 C_{01}$ 11. A method of extracting pixel values from a signal comprising plurality of discrete cosine transform (DCT) coefficients derived from values of pixels in a source image, the method comprising:

storing a plurality of pre-calculated parameters, each of which is associated with a particular pixel whose value is to be extracted; and for any particular pixel value to be extracted, calculating the pixel value using the pre-calculated parameters associated therewith together with one or more of the DCT coefficients;

wherein for a block of 8 by 8 DCT coefficients, a block of 4 by 4 pixels are extracted, the pixel values being calculated in accordance with the following equations, wherein x(i,j) is the extracted value of pixel (i,j), C(u,v) is the DCT coefficient (u,v) with respect to the DCT coefficient block, and >>x represents an effective divide by $2^x$:

$\bar{x}_{00} = A_{1+3} >> 3 + 0.176(B_3 + B_1 + C_{11})$ $\bar{x}_{10} = A_{2+4} >> 3 + 0.176 B_2 + (B_3 >> 4) + (C_{11} >> 4)$ $\bar{x}_{20} = A_{2+4} >> 3 + 0.176 B_2 - (B_3 >> 4) - (C_{11} >> 4)$ $\bar{x}_{30} = A_{1+3} >> 3 - (B_3 - B_1) >> 4 - (C_{11} >> 4)$ $\bar{x}_{01} = A_{1-3} >> 3 + 0.176 B_3 + (B_1 >> 4) + (C_{11} >> 4)$ $\bar{x}_{11} = A_{2-4} >> 3 + (B_4 + B_2) >> 4$ $\bar{x}_{21} = A_{2-4} >> 3 - (B_4 - B_2) >> 4$ $\bar{x}_{31} = A_{1-3} >> 3 - 0.176 B_4 + (B_1 >> 4) + (C_{11} >> 4)$ $\bar{x}_{02} = A_{1-3} >> 3 + 0.176 B_4 - (B_1 >> 4) - (C_{11} >> 4)$ $\bar{x}_{12} = A_{2-4} >> 3 + (B_4 >> 4) - (B_2 >> 4)$ $\bar{x}_{22} = A_{2-4} >> 3 - (B_4 + B_2) >> 4$ $\bar{x}_{32} = A_{1-3} >> 3 - 0.176 B_4 - (B_1 >> 4) + (C_{11} >> 4)$ $\bar{x}_{03} = A_{1+3} >> 3 + 0.176(B_4 - B_1 - C_{11})$ $\bar{x}_{13} = A_{2+4} >> 3 - 0.176 B_2 + B_3 >> 4 - (C_{11} >> 4)$ $\bar{x}_{23} = A_{2+4} >> 3 - 0.176 B_2 - (B_3 >> 4) + (C_{11} >> 4)$ $\bar{x}_{33} = A_{1+3} >> 3 - 0.176(B_4 + B_1 - C_{11})$ and where:

$A_{1+3} = A_1 + A_3; A_{1-3} = A_1 - A_3; A_{2+4} = A_2 + A_4; A_{2-4} = A_2 - A_4;$ $A_1 = C(0,0) + C(2,0); A_2 = C(0,0) - C(2,0);$ $A_3 = C(0,2) + C(2,2); A_4 = C(0,2) - C(2,2)$ $B_1 = C(0,1) + C(2,1); B_2 = C(0,1) - C(2,1);$ $B_3 = C(1,0) + C(1,2); B_4 = C(1,0) - C(1,2);$

12. An apparatus for extracting pixel values from a signal containing a plurality of discrete cosine transform (DCT) coefficients derived from values of pixels in a source image, the apparatus comprising:

storage means for storing a plurality of pre-calculated weighting factors; and calculating means for, for any particular pixel value to be extracted, calculating the pixel value as a weighted sum of selected ones of the coefficients, except, in the case of a weighting factor that is close to a power of two, the power of two itself being used, and the weighting being implemented by binary shifting.

13. An apparatus according to claim 12, wherein an extracted pixel value is an average value of respective values of a set of pixels in the source image.

14. An apparatus according to claim 12, wherein the DCT coefficients used by the calculating means are those which are representative of the highest energy with respect to the DCT transform.

15. An apparatus for extracting pixel values from a signal containing a plurality of discrete cosine transform (DCT) coefficients derived from values of pixels in a source image, the apparatus comprising:

a storage means for storing a plurality of pre-calculated parameters, each of which is associated with a particular pixel whose value is to be extracted; and calculating means for, for any particular pixel value to be extracted, calculating the pixel value using the pre-calculated parameters associated therewith together with one or more of the DCT coefficients; and further arranged such that for a block of 8 by 8 DCT coefficients, a block of 2 by 2 pixels are extracted, the pixel values being calculated by the calculating means in accordance with the following equations:

$\bar{x}(0, 0) = \frac{1}{8}\{C(0, 0) + C(1, 0) + C(0, 1) + C(1, 1)\}$ $\bar{x}(0, 1) = \frac{1}{8}\{C(0, 0) + C(1, 0) - C(1, 1) - C(0, 1)\}$ $\bar{x}(1, 0) = \frac{1}{8}\{C(0, 0) - C(1, 0) + C(0, 1) - C(1, 1)\}$ $\bar{x}(1, 1) = \frac{1}{8}\{C(0, 0) - C(1, 0) - C(0, 1) + C(1, 1)\}$ wherein x(i,j) is the extracted value of pixel (i,j), and C(u,v) is the DCT coefficient (u,v) with respect to the DCT coefficient block.

16. An apparatus for extracting pixel values from a signal containing a plurality of discrete cosine transform (DCT) coefficients derived from values of pixels in a source image, the apparatus comprising:

a storage means for storing a plurality of pre-calculated parameters, each of which is associated with a particular pixel whose value is to be extracted; and calculating means for, for any particular pixel value to be extracted, calculating the pixel value using the pre-calculated parameters associated therewith together with one or more of the DCT coefficients; and further arranged such that for a block of 8 by 8 DCT coefficients, a block of 4 by 4 pixels are extracted, the pixel values being calculated by the calculating means in accordance with the following equations, wherein x(i,j) is the extracted value of pixel (i,j), C(u,v) is the DCT coefficient (u,v) with respect to the DCT coefficient block, and >>x represents an effective divide by $2^x$:

$\bar{x}_{00} = C_{00} >> 3 + 0.176 C_{10} + C_{20} >> 3 + 0.176 C_{01}$ $\bar{x}_{10} = C_{00} >> 3 + (C_{10} >> 4) - (C_{20} >> 3) + 0.176 C_{01}$ $\bar{x}_{20}=C_{00}>>3-(C_{10}>>3)-(C_{20}>>3)+0.176C_{01}$ $\bar{x}_{30}=C_{00}>>3-0.176C_{10}+(C_{20}>>3)+0.176C_{01}$ $\bar{x}_{01}=C_{00}>>3+0.176C_{10}+(C_{20}>>3)+(C_{01}>>4)$ $\bar{x}_{11}=C_{00}>>3+(C_{10}>>4)-(C_{20}>>3)+(C_{01}>>4)$ $\bar{x}_{21}=C_{00}>>3-(C_{10}>>4)+(C_{20}>>3)+(C_{01}>>4)$ $\bar{x}_{31}=C_{00}>>3-0.176C_{10}+(C_{20}>>3)+(C_{01}>>4)$ $\bar{x}_{02}=C_{00}>>3+0.176C_{10}-(C_{20}>>3)-(C_{01}>>4)$ $\bar{x}_{12}=C_{00}>>3+(C_{1}>>4)-(C_{20}>>3)-(C_{01}>>4)$ $\bar{x}_{22}=C_{00}>>3-(C_{10}>>4)-(C_{20}>>3)-(C_{01}>>4)$ $\bar{x}_{32}=C_{00}>>3-0.176C_{10}+(C_{20}>>3)-(C_{01}>>4)$ $\bar{x}_{03}=C_{00}>>3+0.176C_{10}+(C_{20}>>3)-0.176C_{01}$ $\bar{x}_{13}=C_{00}>>3+C_{10}>>4-(C_{20}>>3)-0.176C_{01}$ $\bar{x}_{23}=C_{00}>>3-(C_{10}>>4)-(C_{20}>>3)-0.176C_{01}$ $\bar{x}_{33}=C_{00}>>3-0.176C_{10}-(C_{20}>>3)-0.176C_{01}$ 17. An apparatus for extracting pixel values from a signal containing a plurality of discrete cosine transform (DCT) coefficients derived from values of pixels in a source image, the apparatus comprising:
    a storage means for storing a plurality of pre-calculated parameters, each of which is associated with a particular pixel whose value is to be extracted; and
    calculating means for, for any particular pixel value to be extracted, calculating the pixel value using the pre-calculated parameters associated therewith together with one or more of the DCT coefficients; and
    further arranged such that for a block of 8 by 8 DCT coefficients, a block of 4 by 4 pixels are extracted, the pixel values being calculated by the calculating means in accordance with the following equations, wherein x(i,j) is the extracted value of pixel (i,j), C(u,v) is the DCT coefficient (u,v) with respect to the DCT coefficient block, and >>x represents an effective divide by $2^x$:

$\bar{x}_{00}=A_{1+3}>>3+0.176(B_3+B_1+C_{11})$ $\bar{x}_{10}=A_{2+4}>>3+0.176B_2+(B_3>>4)+(C_{11}>>4)$ $\bar{x}_{20}=A_{2+4}>>3+0.176B_2-(B_3>>4)-(C_{11}>>4)$ $\bar{x}_{30}=A_{1+3}>>3-(B_3-B_1)>>4-(C_{11}>>4)$ $\bar{x}_{01}=A_{1-3}>>3+0.176B_3+(B_1>>4)+(C_{11}>>4)$ $\bar{x}_{11}=A_{2-4}>>3+(B_4+B_2)>>4$ $\bar{x}_{21}=A_{2-4}>>3-(B_4-B_2)>>4$ $\bar{x}_{31}=A_{1-3}>>3-0.176B_4+(B_1>>4)+(C_{11}>>4)$ $\bar{x}_{02}=A_{1-3}>>3+0.176B_4-(B_1>>4)-(C_{11}>>4)$ $\bar{x}_{12}=A_{2-4}>>3+(B_4>>4)-(B_2>>4)$ $\bar{x}_{22}=A_{2-4}>>3-(B_4+B_2)>>4$ $\bar{x}_{32}=A_{1-3}>>3-0.176B_4-(B_1>>4)+(C_{11}>>4)$ $\bar{x}_{03}=A_{1+3}>>3+0.176(B_4-B_1-C_{11})$ $\bar{x}_{13}=A_{2+4}>>3-0.176B_2+B_3>>4-(C_{11}>>4)$ $\bar{x}_{23}=A_{2+4}>>3-0.176B_2-(B_3>>4)+(C_{11}>>4)$ $\bar{x}_{33}=A_{1+3}>>3-0.176(B_4+B_1-C_{11})$ and where:

$A_{1+3}=A_1+A_3; A_{1-3}=A_1-A_3; A_{2+4}=A_2+A_4; A_{2-4}=A_2-A_4;$ $A_1=C(0,0)+C(2,0); A_2=C(0,0)-C(2,0);$ $A_3=C(0,2)+C(2,2); A_4=C(0,2)-C(2,2)$ $B_1=C(0,1)+C(2,1); B_2=C(0,1)-C(2,1);$ $B_3=C(1,0)+C(1,2); B_4=C(1,0)-C(1,2).$

* * * * *